(12) United States Patent
Dimou et al.

(10) Patent No.: US 10,165,455 B2
(45) Date of Patent: Dec. 25, 2018

(54) COORDINATION FOR PBCH

(71) Applicant: TELEFONAKTIEBOLAGET LM ERICSSON (PUBL), Stockholm (SE)

(72) Inventors: Konstantinos Dimou, San Francisco, CA (US); Johan Bergman, Stockholm (SE); Erik Eriksson, Linköping (SE); Muhammad Kazmi, Bromma (SE); Anders Wallén, Ystad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 102 days.

(21) Appl. No.: 14/913,664

(22) PCT Filed: Jul. 3, 2014

(86) PCT No.: PCT/SE2014/050856
§ 371 (c)(1),
(2) Date: Feb. 22, 2016

(87) PCT Pub. No.: WO2015/026281
PCT Pub. Date: Feb. 26, 2015

(65) Prior Publication Data
US 2016/0212636 A1    Jul. 21, 2016

Related U.S. Application Data

(60) Provisional application No. 61/868,956, filed on Aug. 22, 2013.

(51) Int. Cl.
*H04W 24/02* (2009.01)
*H04W 48/10* (2009.01)
(Continued)

(52) U.S. Cl.
CPC ........... *H04W 24/02* (2013.01); *H04L 5/0035* (2013.01); *H04L 5/0053* (2013.01); *H04W 8/245* (2013.01); *H04W 48/10* (2013.01); *H04W 56/001* (2013.01)

(58) Field of Classification Search
CPC .... H04L 5/0035; H04L 5/0053; H04W 24/02; H04W 48/10; H04W 56/001; H04W 8/245
See application file for complete search history.

(56) References Cited

U.S. PATENT DOCUMENTS 9,510,322 B2 * 11/2016 Doppler ............ H04W 72/005
2005/0043046 A1 * 2/2005 Lee .................. H04W 36/0072
455/502
(Continued)

FOREIGN PATENT DOCUMENTS

CN    101803437 A    8/2010
CN    103098537 A    5/2013
(Continued)

OTHER PUBLICATIONS

Novelty Search Report dated Apr. 14, 2014, 10 pages.
(Continued)

*Primary Examiner* — Babar Sarwar
(74) *Attorney, Agent, or Firm* — Rothwell, Figg, Ernst & Manbeck, P.C.

(57) ABSTRACT

According to one aspect there is provided a method in a first network node of a telecommunication network. The network has a plurality of base stations which are operable to transmit a broadcast channel repetition pattern comprising at least one time window of a first mode of operation. The first mode of operation is interspersed between periods of a second mode of operation. The number of repetitions of a broadcast channel in a given period is greater in the first mode than in the second mode. The method comprises determining first
(Continued)

data regarding a broadcast channel repetition pattern to be or being transmitted by a first base station. The first data comprises at least timing information about the timing of the time windows of the first mode of operation. The method also comprises sending the first data to a second network node that controls operation of a second base station neighboring the first base station.

20 Claims, 9 Drawing Sheets

(51) Int. Cl.
*H04W 8/24* (2009.01)
*H04W 56/00* (2009.01)
*H04L 5/00* (2006.01)

(56) References Cited

U.S. PATENT DOCUMENTS

| | | | | |
|---|---|---|---|---|
| 2007/0047493 | A1* | 3/2007 | Park | H04W 36/0055 |
| | | | | 370/331 |
| 2007/0260851 | A1* | 11/2007 | Taha | H04W 52/0229 |
| | | | | 712/204 |
| 2009/0227263 | A1* | 9/2009 | Agrawal | H04W 16/16 |
| | | | | 455/452.1 |
| 2009/0239539 | A1* | 9/2009 | Zhang | H04W 36/0055 |
| | | | | 455/436 |
| 2010/0091735 | A1* | 4/2010 | Kim | H04L 1/0041 |
| | | | | 370/331 |
| 2010/0167746 | A1* | 7/2010 | Lee | H04W 48/12 |
| | | | | 455/450 |
| 2010/0220651 | A1 | 9/2010 | Chen et al. | |
| 2011/0320856 | A1 | 12/2011 | Deivasigamani et al. | |
| 2012/0020310 | A1* | 1/2012 | Ji | H04W 48/16 |
| | | | | 370/329 |
| 2012/0163305 | A1* | 6/2012 | Nimbalker | H04W 52/0206 |
| | | | | 370/329 |
| 2012/0302240 | A1* | 11/2012 | Tamaki | H04W 36/0011 |
| | | | | 455/436 |
| 2013/0083749 | A1* | 4/2013 | Xu | H04W 74/0833 |
| | | | | 370/329 |
| 2013/0083753 | A1* | 4/2013 | Lee | H04W 74/0833 |
| | | | | 370/329 |
| 2014/0098761 | A1* | 4/2014 | Lee | H04W 74/006 |
| | | | | 370/329 |
| 2014/0226623 | A1* | 8/2014 | Seo | H04W 36/0055 |
| | | | | 370/331 |
| 2014/0301305 | A1* | 10/2014 | Xu | H04W 72/04 |
| | | | | 370/329 |
| 2015/0327224 | A1* | 11/2015 | Guan | H04L 5/0053 |
| | | | | 370/329 |
| 2015/0358142 | A1* | 12/2015 | Lee | H04L 5/0044 |
| | | | | 370/252 |
| 2016/0198438 | A1* | 7/2016 | Wong | H04L 5/0053 |
| | | | | 370/329 |
| 2016/0295583 | A1* | 10/2016 | Kazmi | H04W 24/08 |

FOREIGN PATENT DOCUMENTS

| | | | |
|---|---|---|---|
| EP | 2747483 | A2 | 6/2014 |
| KR | 10-2010-0023919 | A | 3/2010 |
| KR | 10-2010-0059800 | A | 6/2010 |
| WO | 2012035367 | A1 | 3/2012 |
| WO | 2013027952 | A2 | 2/2013 |
| WO | 2013027952 | A3 | 2/2013 |

OTHER PUBLICATIONS

International Search Report and Written Opinion dated Dec. 17, 2014, in International Application No. PCT/SE2014/050856, 11 pages.
Alcatel-Lucent et al. "PBCH coverage extension for MTC devices" 3GPP TSG-RAN WG1 Meeting #72bis, R1-130938, 2013, 4 pages.
Alcatel-Lucent et al. "Feasibility of coverage extension of physical channels for MTC devices" 3GPP TSG-RAN WG1 Meeting #72, R1-130462, 2013, 7 pages.
ZTE "Physical Broadcast Channel Coverage Enhancement" 3GPP TSG RAN WG1 Meeting #74, R1-133059, 2013, 4 pages.
Supplementary European Search Report issued for European Patent Application No. 14838307.8, dated Jun. 30, 2016, 6 pages.
Ericsson et al., "System information for enhanced coverage MTC UE," 3GPP TSG-RAN WG1 Meeting #74, R1-133422, Barcelona, Spain, Aug. 19-23, 2013. Retrieved from the Internet: URL: http://www.3gpp.org/ftp/tsg_ran/WG1_RL1/TSGR1_74/Docs/ [retrieved on Aug. 10, 2013], 7 pages.
LG Electronics, "Initial procedure and consideration points for the coverage enhancement of MTC UEs," 3GPP TSG RAN WG1 #74, R1-133370, Barcelona, Spain, Aug. 19-23, 2013. Retrieved from the Internet: URL: http://www.3gpp.org/ftp/tsg_ran/WG1_RL1/TSGR1_74/Docs/ [retrieved on Aug. 10, 2013], 6 pages.
Chinese Office Action dated Jul. 31, 2018, issued in Chinese Patent Application No. 201480053710.9, 6 pages.

* cited by examiner

COORDINATION FOR PBCH

CROSS REFERENCE TO RELATED APPLICATION(S)

This application is a 35 U.S.C. § 371 National Phase Entry Application from PCT/SE2014/050856, filed Jul. 3, 2014, designating the United States, and also claims the benefit of U.S. Provisional Application No. 61/868,956, filed Aug. 22, 2013. The disclosures of both applications are incorporated herein in their entirety by reference.

TECHNICAL FIELD

The technology described relates to telecommunication networks, and in particular to techniques for ensuring suitable coverage for devices.

BACKGROUND

In a typical cellular radio system, radio or wireless terminals (also known as mobile stations or devices and/or user equipments (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (in a Universal Mobile Telecommunications System (UMTS) network) or "eNodeB" (in a Long Term Evolution (LTE) network). A cell is a geographical area where radio coverage is provided by the radio base station equipment at a base station site. Each cell is identified by an identity within the local radio area, which is broadcast in the cell. The base stations communicate over the air interface operating on radio frequencies with the user equipments (UEs) within range of the base stations.

In some radio access networks, several base stations may be connected (e.g., by landlines or microwave) to a radio network controller (RNC) or a base station controller (BSC). The radio network controller supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM). Universal Terrestrial Radio Access Network (UTRAN) is essentially a radio access network using wideband code division multiple access (WCDMA) for user equipment (UEs).

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. A number of releases for the Evolved Universal Terrestrial Radio Access Network (E-UTRAN) specification have issued, and as with most specifications, the standard is likely to evolve. The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology where the radio base station nodes are connected to a core network (via Access Gateways (AGWs)) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has what is sometimes termed a "flat" architecture including radio base station nodes without reporting to radio network controller (RNC) nodes.

A currently popular vision of the future of cellular networks includes machines or other autonomous devices communicating between each other (or with an application server) without human interaction. A typical scenario is to have sensors sending measurements infrequently, where each of the transmissions would consist of only small amounts of data. This type of communication is called machine to machine (M2M) communication in the literature, or machine-type communication (MTC), in 3GPP.

M2M or MTC communication can be used for establishing communication between machines and between machines and humans. The communication may comprise transmission or exchange of data, such as measurement data, configuration information etc. or the like and/or signaling. In some applications the M2M/MTC terminals devices may be relatively small devices, for instance of the size of a conventional cellular telephone or smaller, but in other applications the devices could range in size, for example to the size of a base station. As mentioned it has been proposed that such M2M devices may be used for applications such as sensing environmental conditions (e.g. temperature reading), metering or measurement (e.g. electricity usage etc.), fault finding or error detection etc. In these applications the M2M devices may communicate relatively infrequently for a consecutive duration depending upon the type of service e.g. about 200 ms once every 2 seconds, about 500 ms every 60 minutes etc. The M2M device may also do measurement on other frequencies or other RATs.

The path loss between M2M device and the base station can be very large in some scenarios such as when used as a sensor or metering device.

In order for UEs to be able to communicate with the network, either transmit to the network or receive from the network, UEs have to listen to system information (SI) broadcast within the cell. System information includes information related to accessing the network, receiving from the network, performing cell reselection and intersystem handover among others. With LTE (3GPP LTE Rel. 11) for example system information is transmitted as 17 SI messages. There is a Master Information Block (MIB) and 16 SI Blocks (SIBs) transmitted in each cell. The MIB may, for example, be transmitted by using the Physical Broadcast Channel (PBCH), and comprises information necessary for a UE to be able to listen to the other SIs and thus be able to receive in downlink. It is therefore important that a UE be able to receive the information in the MIB.

In scenarios such as described above where the path loss between a base station and a UE, for example an M2M type device, is relatively large it can be difficult for the UE to correctly receive the signal from the base station.

One way to potentially improve the receipt of SI by UEs that suffer from a relatively high path loss is to increase the number of times that a broadcast channel is transmitted in a given period, i.e. to transmit additional repetitions of the broadcast channel, e.g. repetitions of SI information such as MIB information. Conventionally the Physical Broadcast Channel (PBCH) is transmitted once per radio frame. Increasing the number of transmissions of a broadcast channel means that the broadcast channel, i.e. MIB, may be repeated a number of times in a radio frame. These repetitions can also be combined with power boosting.

As new MIB data is transmitted on a certain timescale, which is currently 40 ms for LTE, any such repetitions have to be confined to this time window, i.e. 40 ms. The broadcast channel, e.g. the PBCH, may therefore be configured with frequent repetitions, for example every subframe, during this 40 ms time window with an aim to enhance the reliability of its reception at the UE. If MIB were transmitted at every Transmission Time Interval (TTI) and repetitions were combined with some power boosting of the PBCH then an improvement in link budget of the order of 15-20 dB could be achieved compared to an LTE scheme without such repetitions. Thus the SI may be repeated a number of times which is relatively high, e.g. in the order of several dozens.

However such a transmission scheme would use up the 6 central resource blocks, which could be necessary for other purposes. Thus the overhead associated with such MIB transmission may be unacceptable in at least some applications.

To reduce the overhead associated with such intense MIB repetition the repetition may be implemented such that increased or intense SI repetition does not occur constantly but only within certain time windows. In other words a period of increased repetition of the MIB, i.e. increased repetition of the physical broadcast channel, may occur periodically or sporadically interspersed with periods without such increased repetition. These time windows of increased PBCH repetition, which may be combined within PBCH power boosting, might occur either periodically, or in an event trigger manner.

Additionally the structure of system information transmission could be modified. For example the time window for MIB could be modified so that so as to allow repetition of MIB for longer timescales, for example 80 or 160 ms. Power boosting, for instance power spectral density (PSD) boosting could also be applied if the number of repetitions within the time windows (before the MIB changes) is not sufficient to achieve a desired link budget. In changing the structure of the SI it would also be possible to keep SI content which is necessary for M2M/MTC in one physical channel, which could be a channel that already exists in LTE, or a new defined physical channel.

SUMMARY

The use of broadcast channel, e.g. PBCH, repetition in bursts does however have the drawback, apart from the overhead generated, that significant amount of interference can be generated with respect to neighboring cells. It has been appreciated that, if such PBCH repetition bursts were to occur in neighbor cells in a non-coordinated manner, they might not provide the desired link budget improvement.

One possible solution which mitigates this disadvantage is to co-ordinate information about broadcast channel repetitions, e.g. PBCH channel repetitions.

In accordance with one aspect, there is provided a method, in a first network node of a telecommunication network having a plurality of base stations which are operable to transmit a broadcast channel repetition pattern comprising at least one time window of a first mode of operation. The first mode of operation is interspersed between periods of a second mode of operation. The number of repetitions of a broadcast channel in a given period is greater in the first mode than in the second mode. The method comprises: determining first data regarding a broadcast channel repetition pattern to be or being transmitted by a first base station. The first data comprises at least timing information about the timing of said time windows of the first mode of operation. The method comprises sending said first data to a second network node that controls operation of a second base station neighbouring the first base station.

In accordance with another aspect, there is provided a network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode. The network node is adapted to: determine first data regarding a broadcast channel repetition pattern to be or being transmitted by a first base station, wherein said first data comprises at least timing information about the timing of said time windows of the first mode of operation; and send said first data to a second network node that controls operation of a second base station neighbouring the first base station.

In accordance with another aspect, there is provided a network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode. The network node comprises a processor and a memory. The memory contains instructions executable by said processor whereby said network node is operative to: determine first data regarding a broadcast channel repetition pattern to be or being transmitted by a first base station, wherein said first data comprises at least timing information about the timing of said time windows of the first mode of operation; and send said first data to a second network node that controls operation of a second base station neighbouring the first base station.

In accordance with another aspect, there is provided a method, in a second network node of a telecommunication network having a plurality of base stations which are operable to transmit a broadcast channel repetition pattern comprising at least one time window of a first mode of operation. The first mode of operation is interspersed between periods of a second mode of operation. The number of repetitions of a broadcast channel in a given period is greater in the first mode than in the second mode. The method comprises: receiving first data regarding a broadcast channel repetition pattern to be or being transmitted by a first base station from a first network node. The first data comprises at least timing information about the timing of said time windows of the first mode of operation. The method comprises generating at least one control signal based on said control data for controlling broadcast transmissions of a second base station.

In accordance with another aspect, there is provided a network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode. The network node is adapted to: receive, from a first network node, first data regarding a broadcast channel repetition pattern to be or being transmitted by a first base station, wherein said first data comprises at least timing information about the timing of said time windows of the first mode of operation, and generate at least one control signal based on said control data for controlling broadcast transmissions of a second base station.

In accordance with another aspect, there is provided a network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode. The network node comprises a processor and a memory. The memory contains instructions executable by said processor whereby said network node is operative to: receive, from a first network node, first data regarding a broadcast channel repetition pattern to be or being transmitted by a first base station, wherein said first data comprises at least timing information about the timing of said time windows of the first mode of operation, and generate at least one control signal based on said control data for controlling broadcast transmissions of a second base station.

In accordance with another aspect, there is provided a method in a user equipment comprising receiving information relating to a broadcast channel repetition pattern to be or being transmitted in a neighbouring cell to the cell serving the user equipment. The user equipment uses said information relating to the broadcast channel repetition pattern of the neighbouring cell to perform one or more radio operations.

In accordance with another aspect, there is provided a user equipment for use in a telecommunication network, wherein the user equipment is adapted to receive information relating to a broadcast channel repetition pattern to be or being transmitted in a neighbouring cell to the cell serving the user equipment. The user equipment is adapted to perform one or more radio operations using said information relating to the broadcast channel repetition pattern of the neighbouring cell.

In accordance with another aspect, there is provided a user equipment for use in a telecommunication network, the user equipment comprising a processor and a memory. The memory contains instructions executable by said processor whereby said user equipment is operative to: receive information relating to a broadcast channel repetition pattern to be or being transmitted in a neighbouring cell to the cell serving the user equipment; and perform one or more radio operations using said information relating to the broadcast channel repetition pattern of the neighbouring cell.

In accordance with another aspect, there is provided a method, in a network node of a telecommunication network having a plurality of base stations which are operable to transmit a broadcast channel repetition pattern comprising at least one time window of a first mode of operation. The first mode of operation is interspersed between periods of a second mode of operation. The number of repetitions of a broadcast channel in a given period is greater in the first mode than in the second mode. The method comprises: transmitting to one or more user equipments served by a serving cell information regarding a broadcast channel repetition pattern to be or being transmitted in a neighbouring cell to the serving cell.

In accordance with another aspect, there is provided a network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode. The network node is adapted to transmit to one or more user equipments served by a serving cell information regarding a broadcast channel repetition pattern to be or being transmitted in a neighbouring cell.

In accordance with another aspect, there is provided a network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode. The network node comprises a processor and a memory. The memory contains instructions executable by said processor whereby said network node is operative to transmit to one or more user equipments served by a serving cell information regarding a broadcast channel repetition pattern to be or being transmitted in a neighbouring cell.

Thus at least a first base station (or other broadcast node) may be configured to be operable to transmit repetitions of a broadcast channel, e.g. repetition of master information block data. The first base station may be operable in a first mode which comprises a plurality of broadcast channel repetitions. The first base station may also be operable in a second mode and the number of broadcast channel repetitions in the first mode is greater than in the second mode. The second mode may correspond to normal or conventional broadcast channel transmission. The broadcast channel may be the physical broadcast channel and/or the repetitions may be repetitions in time of master information block data. In the first mode there may be multiple repetitions within a first time period. The first time period is equal to or less than the period between transmission of new master information block data. In some embodiments the first time period may be equal to 40 ms. In the first mode the repetitions may be every sub-frame within the first time period. The second mode may comprise a normal transmission mode of the PBCH.

A network node, which may be the first base station or a node capable or controlling said first base station (or said other broadcast node), may be configured to initiate broadcast channel repetition, e.g. operation in the first mode, periodically and/or in response to one or more criteria being met. For instance the network node may initiate operation in the broadcast channel repetition in response to a detection of one or more, e.g. a threshold number, of UEs that would benefit from coverage enhancement. The network node may additionally or alternatively initiate operation of broadcast channel repetition in response to a request from at least one UE. The network node may additionally or alternatively initiate operation in broadcast channel repetition in response to a request or instruction from another network node which may be a neighboring network node or a controlling network node.

Before initiating operation of broadcast channel repetition the network node may determine a status of at least one neighboring cell to the first base station and/or co-ordinate operation in broadcast channel repetition in line with the operation of neighboring cells. The network node may determine whether or not a neighboring cell is synchronised with the cell of the first base station. The network node may determine whether or not a neighboring cell is time aligned with the cell of the first base station. The network node may determine whether or not a neighboring cell is broadcasting the same MIB content as the first base station, i.e. whether the relevant MIB data is the same.

In the event that a second base station in a neighboring cell is synchronised and broadcasting the same MIB content as the first base station, the network node may co-ordinate with at least one other network node which may include the second base station and/or a network node able to control the second base station, so that the first and second base station both operate broadcast channel repetition and that the periods of broadcast channel repetition are substantially simultaneous. In this way UEs may benefit from the broadcast channel transmission from both cells. The network node or at least one of the first and second base stations may co-ordinate with at least one other network node which may include the second base station and/or a network node able to control the second base station so that the first and second bases stations transmit the simultaneous broadcast channel data with substantially the same demodulation characteristics, for instance using the same demodulation reference signal.

In some embodiments however operation so that broadcast channel repetition of two or more cells is substantially simultaneous may depend on a determination of the number of UEs in at least one of the cells that are capable of interference cancellation.

In the event that a second base station in a neighboring cell are not synchronised and/or are not broadcasting the same MIB content as the first base station, the network node may co-ordinate with at least one other network node which may include the second base station and/or a network node able to control the second base station, so that the first and second base station both operate broadcast channel repetition and that the periods of broadcast channel repetition are not substantially simultaneous, i.e. the periods of broadcast channel repetition do not substantially overlap.

In some embodiments however in the event that a second base station in a neighboring cell is not synchronised and/or not broadcasting the same MIB content as the first base station, but that a certain number of UEs in at least one of said cells are capable of interference cancellation, then the network node may co-ordinate with at least one other network node which may include the second base station and/or a network node able to control the second base station, so that the first and second base station both operate broadcast channel repetition and that the periods of broadcast channel repetition are substantially simultaneous. The network node or first or second base station may then initiate communication of information to UEs to allow interference cancellation. The information may comprise demodulation reference information.

The network node may, determine an appropriate pattern for broadcast channel repetition for at least the first base station. The network node may determine at least one of: pattern repeat periodicity, pattern starting reference time, pattern density, subframes in which the broadcast channel is repeated, power level of broadcast channel, whether or not power boosting is applied, duration over which the pattern is applied, ending time of the pattern, type of broadcast channel. At least some pattern parameters may be pre-defined. The network node may, determine appropriate transmission parameters for broadcast channel repetition.

The network node may send or receive data regarding the pattern of broadcast channel repetition to or from at least one other network node which may include the second base station and/or a network node able to control the second base station.

In some embodiments a network node may receive first data from another network node, which may be a first base station of a node controlling a first base station, the first data comprising data about the pattern and/or transmission parameters of a broadcast pattern repetition to be used by the first base station. Such a network node may adapt a broadcast channel repetition of a second base station based on such first data. The network node in this embodiment may be the second base station or node controlling the second base station.

In some embodiments a network node initiates transmission of data first data comprising data about the pattern and/or transmission parameters of a broadcast pattern repetition to be used by the first base station to at least one UE. The network node in this embodiment may be the first base station or a second base station in a neighboring cell to the first base station or a network node controlling the first and/or second base station.

Embodiments also relate to a UE which can receive first data comprising data about the pattern and/or transmission parameters of a broadcast pattern repetition to be used by the first base station from a network node. The UE may be operable to read the broadcast channel of the cell of the first base station to acquire its SI. The UE may be operable to use the received data to cancel or mitigate or minimize or eliminate the interference generated from the broadcast channel.

Embodiments also relate to a UE which can signal to a network node whether it is able to use first data comprising data about the pattern and/or transmission parameters of a broadcast pattern repetition to be used by the first base station.

Embodiments relate to network node in control of mobile terminals and employing a scheme with frequent PBCH transmissions within specified time windows and communicating with the neighbor stations the timing instants at which frequent PBCH transmissions start and in addition communicating the PBCH repetition characteristics as well as the MIB content.

The network node may receive the notification on PBCH transmission characteristics from the neighbor cell and defines its PBCH repetition window accordingly.

Embodiments also relate to the transmission via the communicating interface between base stations such as X2, or S1 in LTE, or any other proprietary interface, of common DM-RS between neighbor cells which are time aligned and synchronized and which transmit the same MIB content.

Embodiments also relate to the exchange via the communicating interface between base stations such as X2, or S1 in LTE, or any other proprietary interface, of the number of terminals equipped with interference canceling receivers.

Embodiments also relate to a network node signaling notification on PBCH transmission characteristics in at least one of the serving cell and one or more neighbor cells.

Embodiments also relate to a UE receiving notification on PBCH transmission characteristics in at least one neighbor cell and applying interference cancellation of the corresponding PBCH transmission.

Embodiments also relate to a UE receiving notification on PBCH transmission characteristics in its serving cell and using the corresponding PBCH transmission to perform at least one of channel estimation and frequency error estimation.

DETAILED DESCRIPTION

Figure 1:
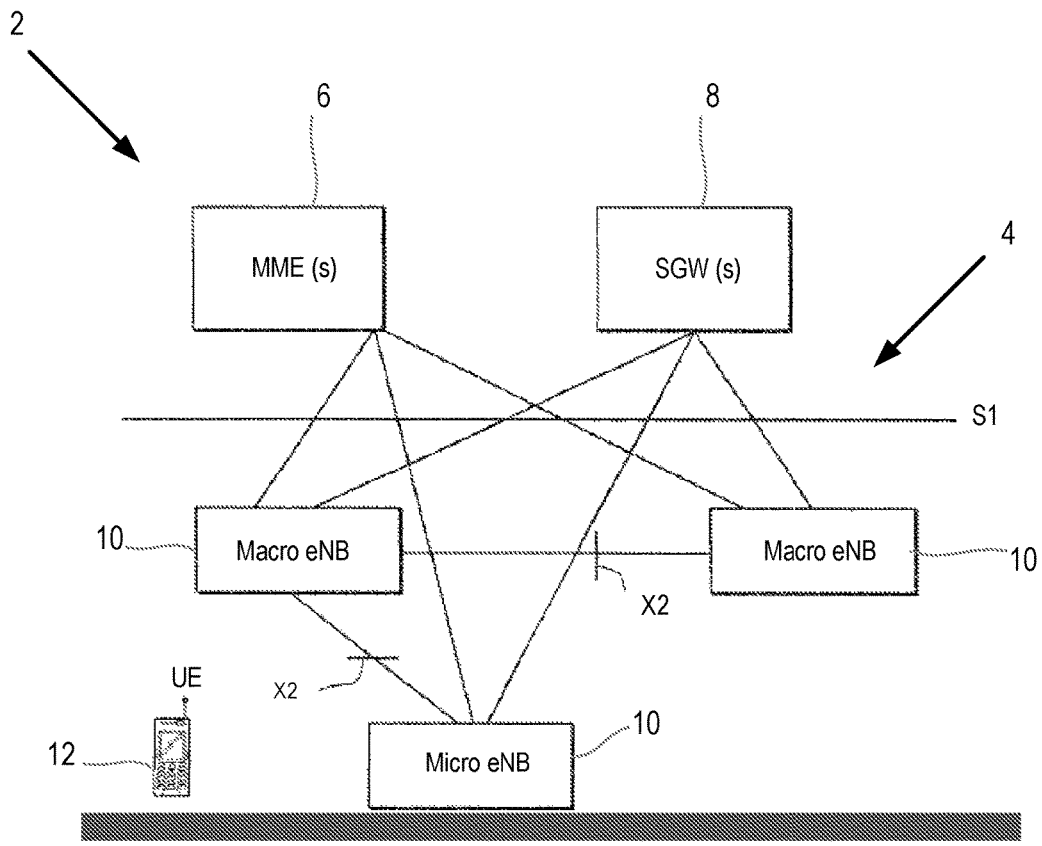
FIG. 1 is a non-limiting example block of an LTE cellular communication network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in UL and receiving and/or measuring signals in DL. A UE herein may comprise a UE (in its general sense) capable of operating or at least performing measurements in one or more frequencies, carrier frequencies, component carriers or frequency bands. It may be a "UE" operating in single- or multi-RAT or multi-standard mode. Examples of a UE include a target device, device to device UE, machine type UE or UE capable of machine to machine communication, PDA, iPAD, Tablet, mobile terminals, smart phone, laptop embedded equipment (LEE), laptop mounted equipment (LME), USB dongles, customer premises equipment (CPE) etc. It will be appreciated that a UE, particularly a MTC device, does not have to be operated by a user when transmitting and/or receiving signals or performing other radio operations. The term "mobile device" may also be used in this description and shall be taken to mean the same as a "UE". Again however it will be appreciated that such a device, in particular a MTC device, does not have to be mobile in the sense that it is carried by a user.

A cell is associated with a base station, where a base station comprises in a general sense any node transmitting radio signals in the downlink (DL) and/or receiving radio signals in the uplink (UL). Some example base stations, or terms used for describing base stations, are eNodeB, eNB, Node B, macro/micro/pico/femto radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

The term radio network node is sometimes used and it refers to any type of network node serving UE and/or connected to other network node or network element or any radio node from where UE receives signal. Examples of radio network nodes are Node B, base station (BS), multi-standard radio (MSR) radio node such as MSR BS, eNodeB, network controller, radio network controller (RNC), base station controller, relay, donor node controlling relay, base transceiver station (BTS), access point (AP), wireless router, transmission points, transmission nodes, RRU, RRH, nodes in distributed antenna system (DAS) etc.

It should be noted that use of the term "network node" as used herein can refer to any to any type of radio network node, a base station, such as an eNodeB, a network node in the RAN responsible for resource management, such as a radio network controller (RNC), or a core network node, such as a mobility management entity (MME) or an MSC. Examples of networks nodes also include O&M, OSS, SON, positioning node (e.g. E-SMLC), MDT etc.

The signalling described is either via direct links or logical links (e.g. via higher layer protocols and/or via one or more network nodes). For example, signalling from a coordinating node may pass another network node, e.g., a radio node.

It will be appreciated that although the following description of the embodiments relates to EUTRAN, the principles described herein are equally applicable to UTRAN and similar wireless communication systems.

FIG. 1 shows an example diagram of a EUTRAN architecture as part of an LTE-based communications system 2. Nodes in the core network 4 include one or more Mobility Management Entities (MMEs) 6, a key control node for the LTE access network, and one or more Serving Gateways (SGWs) 8 which route and forward user data packets while acting as a mobility anchor. They communicate with base stations 10 referred to in LTE as eNBs, over an interface, for example an S1 interface. The eNBs 10 can include the same or different categories of eNBs, e.g. macro eNBs, and/or micro/pico/femto eNBs. The eNBs 10 communicate with each other over an interface, for example an X2 interface. The S1 interface and X2 interface are defined in the LTE standard. A UE 12 can receive downlink data from and send uplink data to one of the base stations 10 with that base station 10 being referred to as the serving base station of the UE 12.

Figure 2:
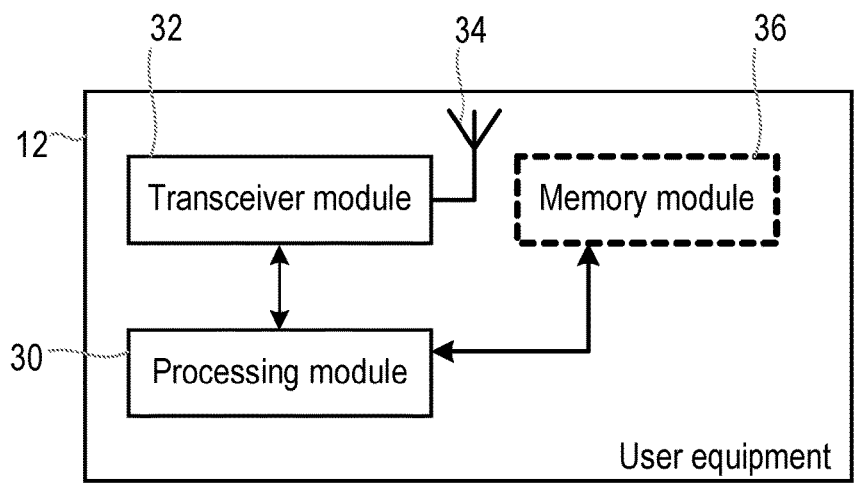
FIG. 2 is a block diagram of a user equipment.

FIG. 2 shows a user equipment (UE) 12 that can be used in one or more of the non-limiting example embodiments described. The UE 12 may in some embodiments be a mobile device that is configured for machine-to-machine (M2M) or machine-type communication (MTC). The UE 12 comprises a processing module 30 that controls the operation of the UE 12. The processing module 30 is connected to a receiver or transceiver module 32 (which comprises a receiver and a transmitter) with associated antenna(s) 34 which are used to receive signals from or both transmit signals to and receive signals from a base station 10 in the network 2. To make use of discontinuous reception (DRX), the processing module 30 can be configured to deactivate the receiver or transceiver module 32 for specified lengths of time. In some embodiments the user equipment 12 may also comprise a memory module 36 that is connected to the processing module 30 and that stores program and other information and data required for the operation of the UE 12. In some embodiments, the UE 12 may optionally comprise a satellite positioning system (e.g. GPS) receiver module 38 that can be used to determine the position and speed of movement of the UE 12.

Figure 3:
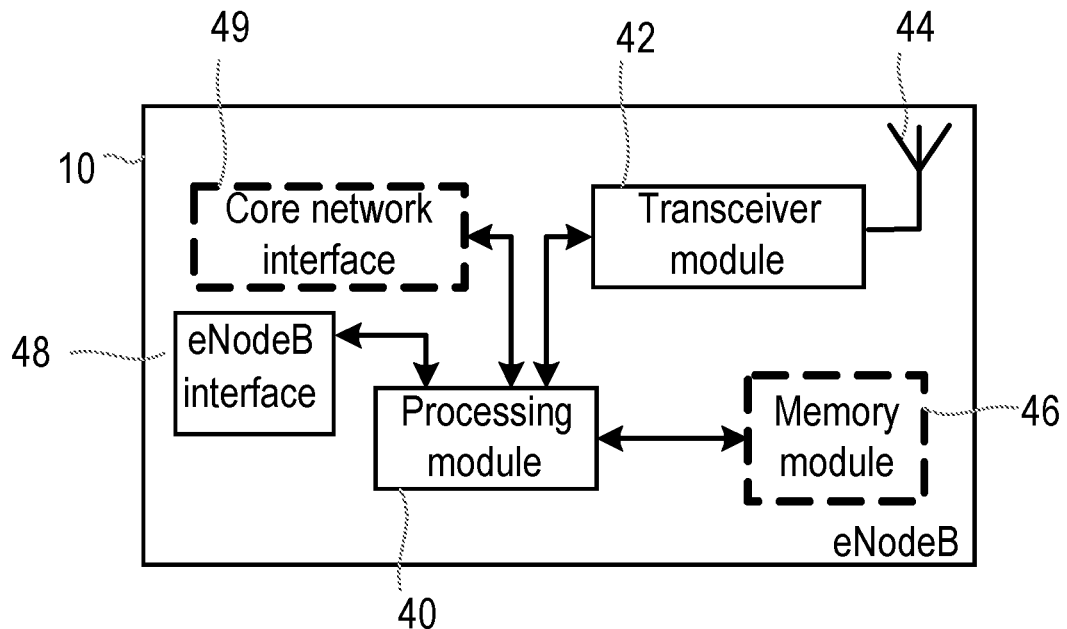
FIG. 3 is a block diagram of a base station.

FIG. 3 shows a base station 10 (for example a NodeB or an eNodeB) that can be used in example embodiments described. It will be appreciated that although a macro eNB will not in practice be identical in size and structure to a micro eNB, for the purposes of illustration, the base stations 10 are assumed to include similar components. Thus, the base station 10 comprises a processing module 40 that controls the operation of the base station 10. The processing module 40 is connected to a transceiver module 42 (which comprises a receiver and a transmitter) with associated antenna(s) 44 which are used to transmit signals to, and receive signals from, user equipments 12 in the network 2. The base station 10 may optionally also comprise a memory module 46 that is connected to the processing module 40 and that stores program and other information and data required for the operation of the base station 10. The base station 10 also includes components and/or circuitry 48 for allowing the base station 10 to exchange information with other base stations 10 (for example via an X2 interface) and components and/or circuitry 49 for allowing the base station 10 to exchange information with nodes in the core network 4 (for example via the S1 interface). It will be appreciated that base stations for use in other types of network (e.g. UTRAN or WCDMA RAN) will include similar components to those shown in FIG. 3 and appropriate interface circuitry 48, 49 for enabling communications with the other network nodes in those types of networks (e.g. other base stations, mobility management nodes and/or nodes in the core network).

Figure 4:
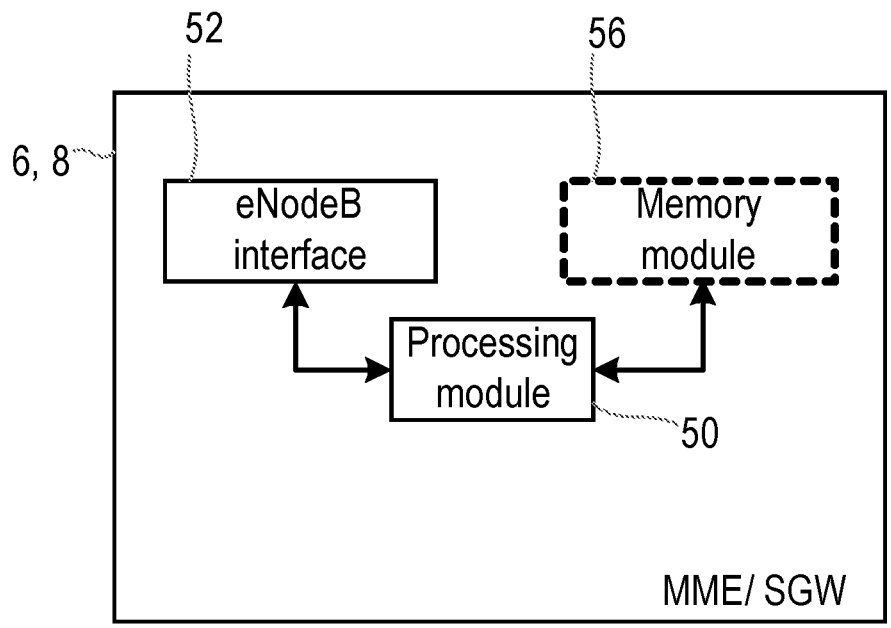
FIG. 4 is a block diagram of a core network node.

FIG. 4 shows a core network node 6, 8 that can be used in the example embodiments described. The node 6, 8 comprises a processing module 50 that controls the operation of the node 6, 8. The processing module 50 is connected to components and/or circuitry 52 for allowing the node 6, 8 to exchange information with the base stations 10 with which it is associated (which is typically via the S1 interface). The node 6, 8 may optionally also comprise a memory module 56 that is connected to the processing module 50 and that stores program and other information and data required for the operation of the node 6, 8.

It will be appreciated that only the components of the UE 12, base station 10 and core network node 6, 8 required to explain the embodiments presented herein are illustrated in FIGS. 2, 3 and 4.

In order for UEs to be able to communicate with the network, either transmit to the network or receive from the network, UEs have to listen to system information (SI) broadcasted within the cell. In use a base station transmits system information (SI). As an example there are already 17 SI messages in 3GPP LTE Rel. 11. There is the Master Information Block (MIB) and 16 SI Blocks (SIBs) transmitted in each cell. MIB may, for example, be transmitted by using the Physical Broadcast Channel (PBCH). System information comprises information related to accessing the network, receiving from the network, performing cell reselection and intersystem handover among others. Information contained within MIB is required by the UE so as to be able to listen to the other SIs and so as to be able to receive in downlink.

As mentioned above in some instances, which may for example occur in some M2M or MTC applications, the path loss between the base station and UE may be relatively high and thus it can be difficult for the UE to correctly receive the signal from the base station. In such situations it may be desirable to provide coverage enhancement to improve the reception of a broadcast channel by UEs.

It has therefore been previously proposed to configure the PBCH with frequent repetitions, i.e. repetitions which are additional to any repetition in conventional transmission, e.g. every subframe during 40 ms. The aim is to enhance the reliability of its reception at the UE.

If, however, MIB, for example, were transmitted at every Transmission Time Interval (TTI) and the repetitions combined with some PBCH power boosting, such a transmission scheme would use up the 6 central resource blocks, which might be necessary for other purposes as well. The overhead due to MIB transmission may be unacceptably high were this mode of operation to be continuously operated.

An intermediate solution which has also previously been proposed is therefore performing these repetitions, i.e. periods of increased or additional broadcast channel repetitions, not constantly, but within certain windows, for example of 40 ms. These time windows of increased PBCH repetition, which may be combined with PBCH power boosting, might occur either periodically, or in an event trigger manner.

Figure 5A:
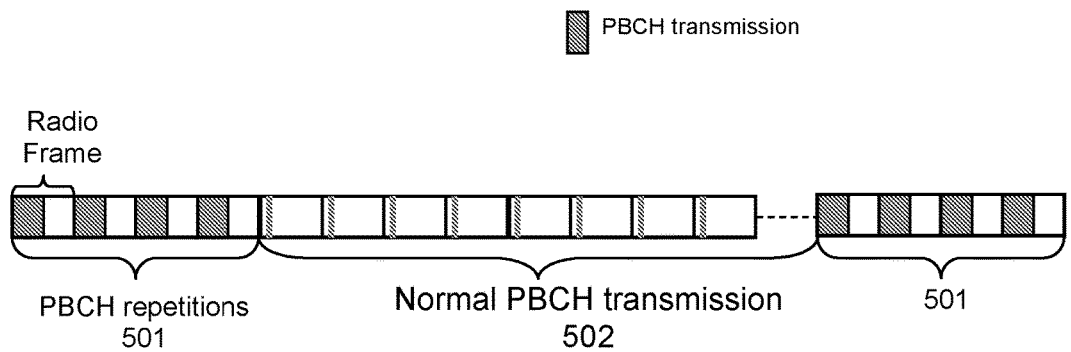
FIGS. 5a to 5c illustrate examples of periods of repetitions of a broadcast channel interspersed with periods of normal transmission.

FIG. 5 illustrates an example of PBCH transmission according to such a scheme. In a first period 501 there are a number of PBCH repetitions. This corresponds to a period of intense PBCH transmissions and represents a first mode of operation of a base station. In the first period therefore the relevant broadcast channel, e.g. the PBCH, is repeated within each radio frame and the broadcast channel transmission consumes a quite a lot of the radio frame. This is interspersed with a period 502 of normal PBCH transmissions which corresponds to a second mode of operation. In such conventional broadcast channel transmission there may be no repetition within a radio frame. By interspersing periods of the first mode of operation with the second mode of operation an acceptable comprises between enhanced coverage and PBCH transmission overhead can be reached. The first mode of operation involving increased PBCH repetitions may occur periodically or may be triggered by events or by certain criteria being fulfilled.

It has been appreciated that a possible problem with this approach is there is the risk that too much interference of "spotlight nature" might be generated to neighboring cells. In other words periods of intense PBCH repetition in one cell may cause increased interference in a neighboring cell. Additionally or alternatively if the neighboring cells also adopt PBCH repetition in time, i.e. also operate in a first mode, and the content between the neighboring cells is not the same, then high interference from multiple neighboring cells all performing PBCH repetitions may mean that the desired increase in link budget is not achieved.

Thus according to one aspect a first network node determines first data regarding a broadcast channel repetition pattern to be or being transmitted by a first base station. The first data comprises at least timing information about the timing of the time windows of the first mode of operation in such a broadcast channel repetition pattern. The first network node sends the first data to a second network node that controls operation of a second base station neighbouring the first base station.

Sending such data about the broadcast channel repetition pattern from the first network node to the second network node is advantageous as it allows various steps to be taken to mitigate or reduce the effect of the periods of intense broadcast channel repetition on neighboring cells and/or devices or UEs served by neighboring cells.

In some embodiments the first network node may send the first data to the second network node so as to co-ordinate operation of the first and second base stations in the first mode. In other words to co-ordinate operation of the first and second base stations such that any periods of operation in the first mode of the first base station, i.e. periods of intense repetition of the broadcast channel, may be specifically timed with regard to periods of operation in the first mode of the second base station. In some instances, as will be described in more detail later, potential interference may be reduced by arranging periods of operation in the first mode of the first and second base stations to be substantially simultaneous. In other instances it may be better to co-ordinate such that such periods of operation in the first mode are not simultaneous. The degree of co-ordination may therefore depend on the status of the first and/or second base station and/or the UEs being served by the base stations.

A proposed solution is therefore to co-ordinate the operation in the first mode, i.e. with increased PBCH repetitions, so as to reduce the effects of possible interference. A network node for coordinating information about the broadcast channel (e.g. PBCH) repetitions within confined time windows between neighbor cells is proposed. One method involves cooperation between neighbor base stations, for example involving the exchange of the PBCH repetition pattern characteristics, such as time repetition patterns, PSD boosting values and other related parameters. This information exchange may be achieved via signaling at the communication interface between neighbor cells or base stations, such as X2, or S1 in 3GPP LTE, or any similar interface.

In the event neighbor cells transmit MIB of different content or in the event that neighbor cells are not synchronized the co-ordination may ensure that neighbor base stations transmit the frequent (in time) repetitions at specified time windows which do not coincide with the frequent PBCH repetitions of neighbor cells. In the case of neighbor cells which are time synchronized (& aligned) and which transmit the same MIB content, then frequent MIB repetitions could occur jointly within the neighbor cells.

A network node may also signal the information about the broadcast channel (e.g. PBCH) repetitions or corresponding pattern to the UE, which may use them for one or more operations e.g. for mitigating interference, for mobility operation, for acquiring SI of neighbor cells etc.

Embodiments may therefore be implemented in a communication network where a plurality of base stations are operable to transmit a broadcast channel repetition pattern. The broadcast channel repetition pattern comprises at least one period of the first mode of operation. As mentioned, in the first mode of operation the number of repetitions of a broadcast channel in a given period is greater than in a second mode of operation. The second mode may, for instance, correspond to normal or conventional broadcast channel repetition, for example with a broadcast channel being repeated once per radio frame until the relevant data is changed. In the first mode the broadcast channel may, for example, by repeated each sub-frame. In general then the first mode of operation may involve more frequent transmission of a broadcast channel than the second mode of operation. Thus at least a first base station (or other broadcast node) may be configured to be operable to transmit repetitions of a broadcast channel, e.g. repetition of master information block data, that is repetitions of a broadcast channel which are additional to any repetition that occurs in normal operation.

As discussed above to ensure an acceptable compromise between coverage enhancement and transmission overhead the first mode of operation is not continuous but a period or time window of operation in the first mode is interspersed with periods of operation in the second mode. The broadcast channel repetition pattern thus comprises at least one period of operation in the first mode.

Note that as used herein references to initiating broadcast channel repetition or to operating with broadcast channel repetition shall refer to operating with increased broadcast channel repetition, i.e. with one or more periods of operation in the first mode of operation.

Figure 5B:
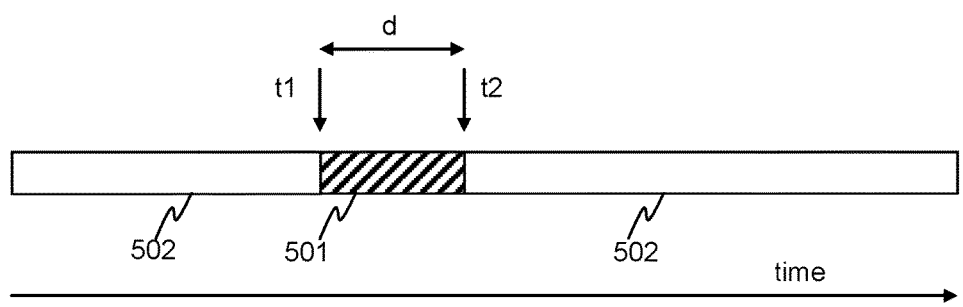

FIG. 5b illustrates one possible pattern. FIG. 5b illustrates how the mode of operation of a base station may change over time. In the example illustrated in FIG. 5b the base station is operating in the second mode operation, i.e. there is a first period of operation in the second mode. At time t1 the mode of operation changes to the first mode of operation and there is a period of operation in the first mode, with increased repetitions of a broadcast channel, until a time t2, at which point the transmission returns the to second mode of operation. Thus there is a period or time window 501 of the first mode of operation interspersed with periods 502 of the second mode of operation. In this example there is a single period 501 of operation in the first mode, at least within the time scale illustrated by FIG. 5b. Thus the broadcast channel repetition pattern comprises just a single continuous period of operation in the first mode.

Figure 5C:
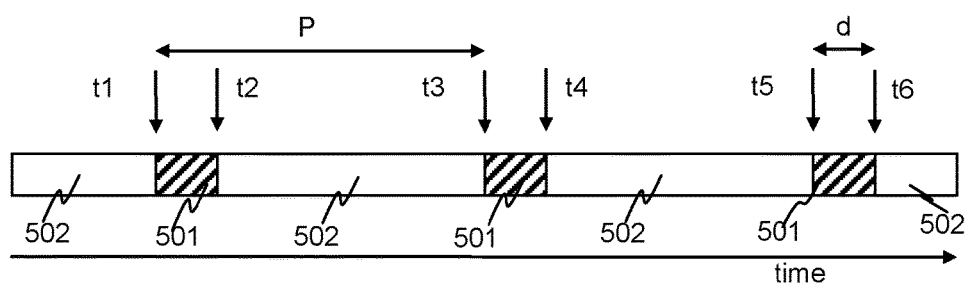

It will be appreciated however that there may be a plurality of periods of operation in the first mode, each interspersed with periods operation in the second mode. FIG. 5c illustrates an example of another broadcast channel repetition pattern. Again the base station is operating in the second mode operation and at time t1 the mode of operation changes to the first mode of operation and there is a period of operation in the first mode, with increased repetitions of a broadcast channel, until a time t2, at which point the transmission returns the to second mode of operation. In this example however a further period 501 of operation in the first mode starts at time t3 and ends at time t4 and a yet further period of operation in the first mode starts at time t5 and ends at time t6. In this example, over the time scale illustrated in the FIG. 5c, the pattern starts at time t1 and ends at time t6. In the example illustrated in FIG. 5c the period P between the start of successive periods 501 of operation in the first mode is constant. Likewise the duration d of the periods 501 of operation in the first mode may all be the same as one another. This can allow the properties of the pattern to the easily defined. It should be appreciated however that this does not need to be the case and the period between successive periods of operation in the first mode may vary and/or the durations of successive periods of operation in the first mode may vary throughout the pattern.

A network node, which may for instance be a first base station or a node controlling a first base station, may therefore operate to initiate transmission of a broadcast channel repetition pattern by the first base station. In other words the network node may be the base station which transmits a broadcast channel repetition pattern or a node controlling such a base station.

Figure 6A:
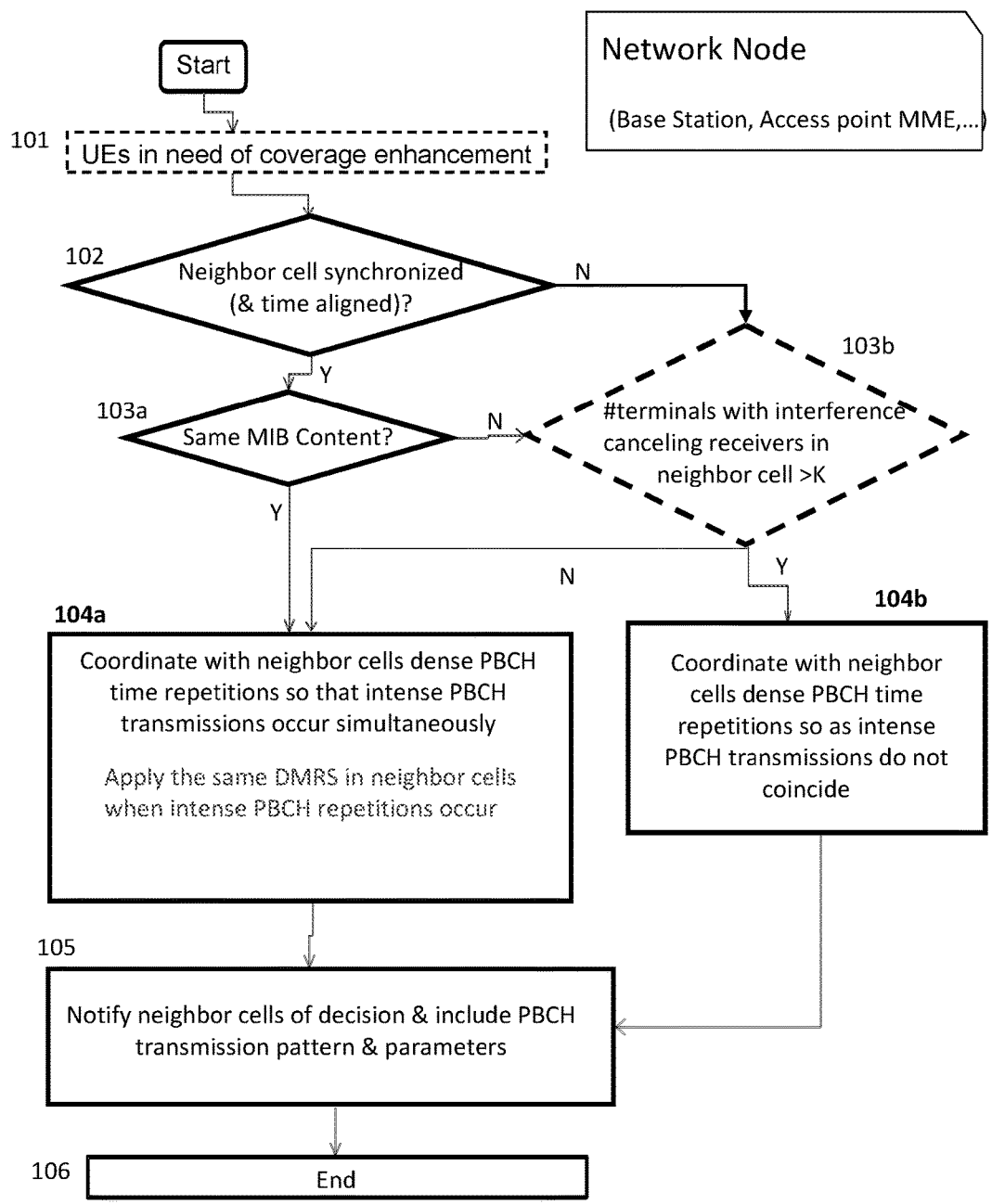
FIG. 6a is a flow chart illustrating a method of operating a network node according to an embodiment.

FIG. 6a illustrates one example of a method that may be implemented at a network node. The following embodiments will be described by considering PBCH as the broadcast channel. However the disclosed methods are not so limited and apply to any type of broadcast channel e.g. secondary broadcast channel, PDSCH, dedicated broadcast channel, etc.

The method may be implemented where a base station is operable in the manner described above in relation to FIG. 5 in a first mode of operation involve a broadcast channel repetition pattern for transmitting the broadcast channel, for example to enhance coverage. The network node may simply operate in the first mode periodically in some embodiments may use one or a plurality of criteria for deciding whether to use a broadcast channel repetition pattern for transmitting the broadcast channel or not.

In one embodiment the network node, e.g. a base station, may optionally decide (step 101) to operate in the first mode based on the number of identified terminals/devices, i.e. UEs, in need of coverage enhancement. For example if there are more than a set number of UEs, e.g. 20 or so, that need enhanced coverage then the network node may decide to configure to operate by repeating the MIB data and may configure the repetition pattern. Thus the network node may initiate transmission of the broadcast channel repetition pattern in response to a detection of a threshold number of user equipments served by the first base station would benefit from coverage enhancement.

There are several methods that can be used for determining number of users requiring enhanced coverage. For example the capability information of the UE capable of enhanced coverage may be available in the network node. The network node may also directly receive such a request from the UE, once the UE has established a radio connection to the network. Such notification may be provided either implicitly by the network detecting the random access channel preamble size used or the terminal signals its request by using radio resource control signaling.

In some embodiments a UE, such as an MTC UE, may have to blindly detect the PBCH repetition pattern during the very initial PBCH system acquisition when the UE is in idle mode and consequently the UE camps on to a cell. This procedure is both time and UE battery life consuming. However once the connection is established to the network, the UE transmits its capability and its state of being in coverage enhancement need. The serving cell then can send its PBCH repetition pattern and the one of neighbor cells to the UE via explicit signaling. This can then aid the UE in establishing a link.

In some embodiments the network node may initiate transmission of a broadcast channel repetition pattern by the first base station in response to a request received by another network node.

Before initiating transmission of the broadcast channel repetition pattern, the network node may determine a status of at least one neighbouring cell to the first base station. In other words before operating with at least one period of intense broadcast channel repetition, i.e. operation in the first mode, the network node may determine the status of at least one neighboring cell and may co-ordinate any periods of intense broadcast channel repetition in line with the neighboring cell(s).

In the example of FIG. 6a, the network node, e.g. the cell or, the controlling base station that is initiating operation with a PBCH, repetition pattern then checks (step 102) to see if the neighbor cell(s) is (are) synchronized in time or time-aligned. This information is readily available in LTE cells, or their controlling base stations, for instance via X2 (or S1) signaling. The information about the synchronization level between network nodes can also be pre-defined or can be stored in the network node.

In the event that neighbor cells are not time synchronized then, in some embodiments, it is checked (step 103b) how many terminals (UEs) in the neighbor cell are equipped with receivers able of canceling other cell interference. For example it can checked if the number of such terminals exceeds a threshold number K. If there are more than K number of terminals in the neighbor cell which can cancel other cell interference, then, in this embodiment, the PBCH repetition schemes of neighbor cells are configured so that they do not coincide in time (104b). In other words the first network node may co-ordinate with the second network node (which may be the second, neighboring base station or a node controlling the second base station) such that a period of operation in the first mode of the first base station does not substantially overlap with a period of operation in the first mode of the second base station. By "does not substantially overlap" is meant that the majority of a period of operation in the first mode of the first base station does not occur at the same time as a period of operation in the first mode of the second base station. In some embodiments the co-ordination may ensure that there is no overlap in time between a period of operation of operation in the first mode of the first and second base stations, i.e. that a period of operation in the first mode of the first base station occurs wholly during a period of operation in the second mode of the second base station. In other embodiments a small degree of overlap may be permissible as a period of operation in the first mode of one of the base stations comes to an end and a period of operation in the first mode of the other base station begins. Such a period of overlap may be limited in time however and may for instance be less than 20% or less than 10% of the duration of the period of operation in the first mode of the first base station.

It will be appreciated that to ensure that a period of operation in the first mode of the first base station does not overlap in time at all with a period of operation in the first mode of the second base station requires that the second base station is operating in the second mode for at least as long as the first base station is operating in the first mode. In some instances this may not be possible and thus some overlap of operation in the first mode of the first and second base stations may be necessary. Additionally it will be appreciated that if there are more than two neighboring cells and it is wished to co-ordinate operation between such cells such that there is transmission in the first mode in each cell which does not overlap with a period of transmission in the first mode in any of the other cells, then the relevant base station for each cell must operate with transmission in the second mode for a duration sufficient to accommodate the total period of operation in the first mode of each of the other cells. In some instances this may be not be desirable or practical and thus some overlap again may be necessary.

Figure 7:
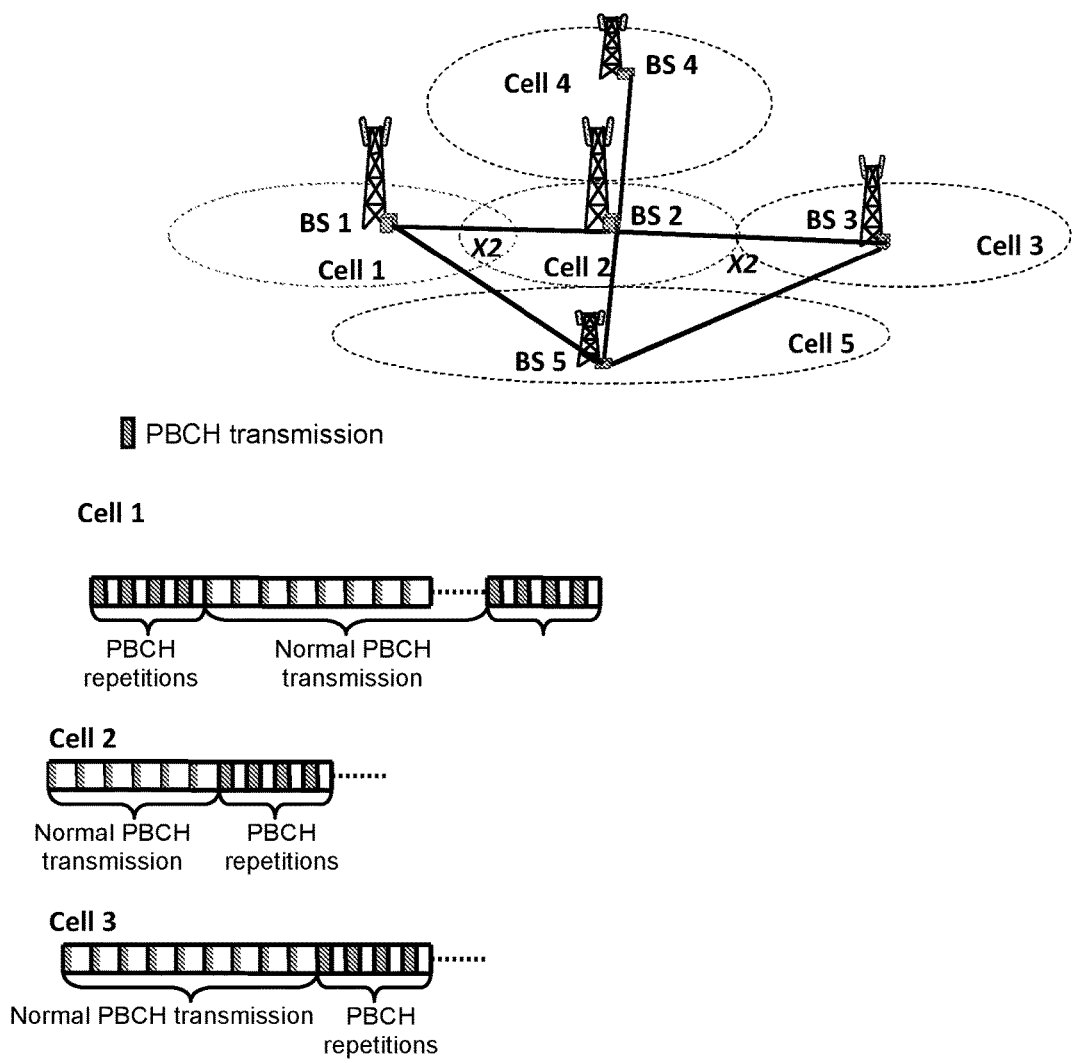
FIG. 7 illustrates a non-limiting example of co-ordination between various cells.

An example of PBCH repetition windows transmissions which do not coincide in time can be seen in FIG. 7. FIG. 7 illustrates that cell 2 can co-ordinate with neighbor cells 1 and 3 so that cell 2 operates with a period of PBCH repetitions, i.e. in a first mode, in a time window that does not overlap with the period of PBCH repetitions of cell 1 or with that of cell 3.

Referring back to FIG. 6a if it is the case that a number of terminals, i.e. UEs, in the neighbor cell do not support interference canceling, then, in this embodiment, the periods of intense PBCH repetitions are configured to occur at same time windows in neighbor cells (step 104a). In other words in the event that the second base station is not synchronised with and/or not broadcasting the same master information block content as the first base station, and the number of user equipments that support interference cancellation is not above the threshold number, the first network node co-ordinates with the second network node such that a period of operation in the first mode of the first base station is substantially simultaneous with a period of operation in the first mode of the second base station. By "substantially simultaneous" is meant that the majority of a period of operation in the first mode of the first base station does occur at the same time as a period of operation in the first mode of the second base station, for example at least 75% or at least 90% of the period of operation in the first mode of the first base station. In some embodiments the co-ordination may ensure that all of the period of operation in the first mode of the first base stations occurs during a period when the second base station is operating in the first mode. In some embodiments the periods of operation of operation in the first mode of the first and second base stations may start and end at the same time, at least within a certain tolerance, and thus have the same duration.

The rationale behind the check at step 103b in some embodiments is that if normal terminals can cancel other cell interference, then these intense PBCH repetitions can occur when normal terminals receive data, e.g. PDSCH, at the neighbor cell and can thus cancel interference from these PBCH repetitions with known pattern and demodulation reference signal (DMRS). If however not so many terminals in the neighbor cell can cancel interference, then, it may be more appropriate to transmit these intense PBCH repetitions within substantially the same time windows in neighbor cells. In this case, only UEs in need of coverage improvement, for instance MTC UEs listen to them. If such UEs are not capable of rejecting interference, or combine time misaligned signals, then, these UEs my experience further delays in listening to the PBCH.

It will be readily understood that in some embodiments the number of terminals supporting interference canceling function in a cell is reported to neighbor cells via the communication interface between neighbor base stations such as X2 or S1 interface, or any other suitable interface.

It will be appreciated that step 103b is optional and instead the network node may alternatively directly to proceed to step 104b. In such a case the algorithm execution is much simpler.

In the event that the neighbor cells are synchronized (& time aligned), it is checked whether the neighbor cells have the same MIB content (step 103a). As one skilled in the art will appreciate it may the case that neighbor cells may have the same SFN number (system frame number for various reasons which are not pertinent to the present discussion), PHICH (Physical H-ARQ Indication channel) configuration and the same downlink (DL) system bandwidth.

In case the neighbor cells under discussion here, e.g. cell 1 & cell 2 in FIG. 7, broadcast the same MIB content, then the PBCH repetition windows of FIG. 5, in this embodiment, are configured to coincide and the same information is broadcast jointly from these neighboring cells (104a). In this case UEs at the relevant cell borders (and to a lesser extent most of the UEs in both cells) benefit from higher amount of received energy. In other words in the event that the second base station is synchronised with the first base station and broadcasting the same master information block content, the first network node co-ordinates with the second network node such that the first and second base stations both transmit a broadcast channel repetition pattern and that periods of operation in the first mode of the first and second base stations are substantially simultaneous.

Optionally, the same DM-RS is used from the neighbor cells when these joint intense PBCH repetitions occur. This would allow terminals listening for the PBCH for the first time to receive jointly, from more than one cell, PBCH repetitions.

It will be understood, that in this case the DM-RS sequence to be used in common will exchanged via the communication interface between neighbor cells such as X2 or S1 or any other suitable interface. It is noted here that the same DM-RS are transmitted jointly from neighbor cells only within the time and frequency resources used when transmitting these PBCH repetitions.

Alternatively, the DM-RS may not be the same in neighbor cells during these PBCH repetitions. In which case the network can inform the UE about the neighbor cell DM RS via dedicated signaling, once the radio resource connection is established between the network and the UE. In this case, joint reception of PBCH from neighboring cells can happen only after the very initial PBCH reading/acquisition.

It will of course be appreciated that the use of the same DM RS in neighbor cells when PBCH repetitions occur is optional.

It should be noted that in some embodiments the co-ordination as to whether a period of operation in the first mode of a first base station is substantially simultaneous with, or does not substantially overlap with, a period of operation in the first mode of a second base station may be based principally on the number of UEs capable of interference cancellation. For example the method could for instance progress from step 101 directly to step 103b and thus does not need to include steps 102 or 103a. In other words the first network node may determine whether a number of user equipments served by at the first base station and/or the second base station that support interference cancellation is above a threshold amount. In the event that the number is not above the threshold the first network node may co-ordinate with the second network node such that a period of operation in the first mode of the first base station is substantially simultaneous with a period of operation in the first mode of the second base station. However in the event that the number of UEs supporting interference cancellation is above the threshold the first network node may co-ordinate with the second network node such that a period of operation in the first mode of the first base station does not substantially overlap with a period of operation in the first mode of the second base station.

It should also be noted that in some embodiments the co-ordination between network nodes may be principally to ensure that a period of operation in the first mode of a first base station does not substantially overlap with a period of operation in the first mode of a second base station. For example the method could for instance progress from step 101 directly to step 104b and thus does not need to include any of steps 102, 103a or 103b. In other words the first network node may send the first data to the second network node so as to co-ordinate the timing of the broadcast channel repetition pattern with any broadcast channel repetition pattern transmitted by a second base station in a neighbouring cell to a cell of the first base station, wherein the first network node co-ordinates with the second network node such that a period of operation in the first mode of the first base station does not substantially overlap with a period of operation in the first mode of the second base station.

If the network node decides to use a broadcast channel repetition pattern then it configures the pattern and also transmits data regarding the broadcast channel repetition pattern to one or more other network nodes, e.g. to neighbor cells/base stations (105).

The network node may, determine an appropriate pattern for broadcast channel repetition for at least the first base station, e.g. the duration and intervals of operation in the first mode and/or also the parameters for the repetition when operating in the first mode.

Embodiments therefore relate to a method in a first network node (e.g. eNode B) of sending information related to its broadcast channel repetition pattern to another network node (e.g. another eNode B, core network node etc). Embodiments also relate to a method in a second network node of receiving from another network node the broadcast channel repetition pattern used in the first network node.

Figure 6B:
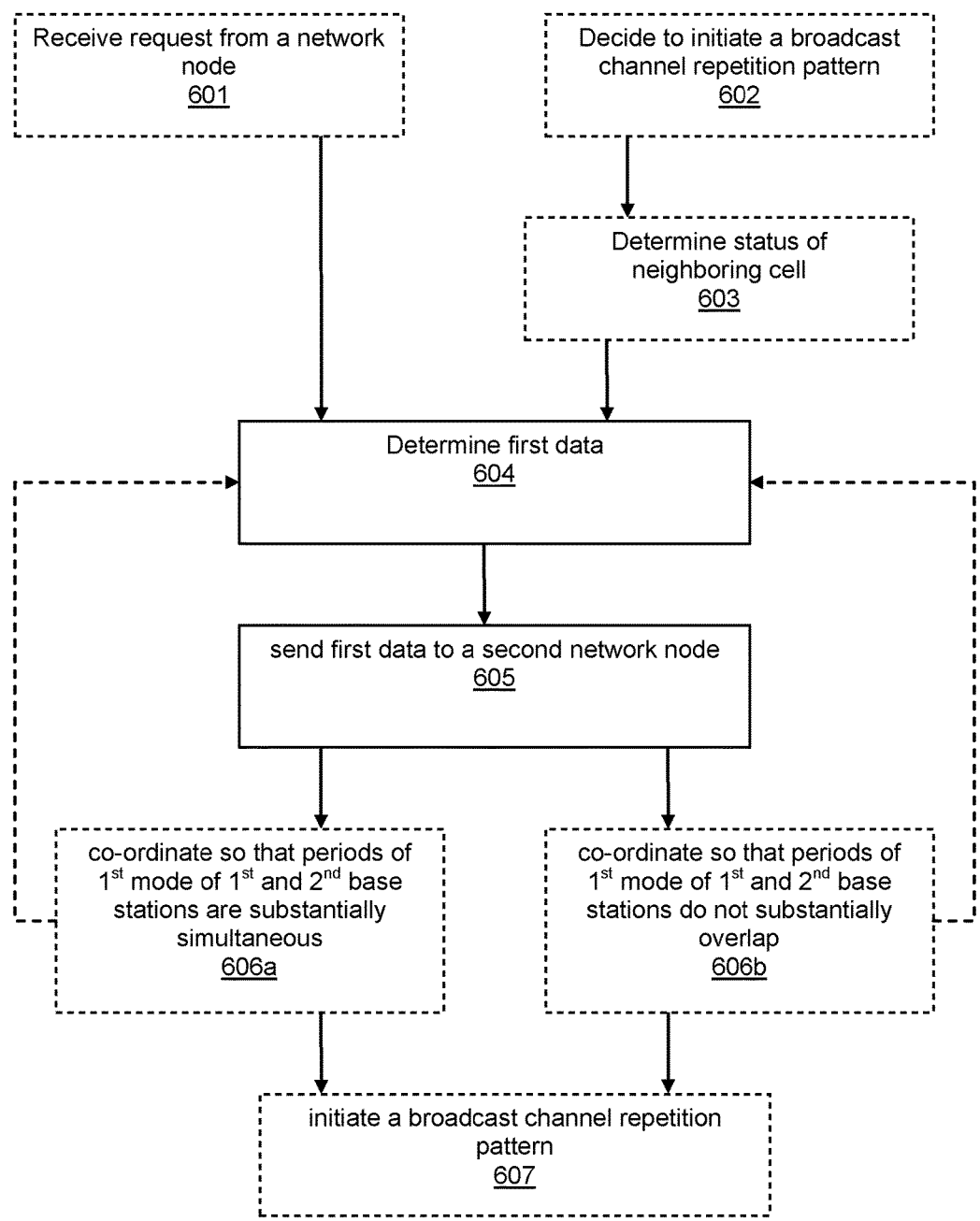
FIG. 6b is a flow chart illustrating another method of operating a first network node according to an embodiment.

FIG. 6b illustrates one method in a first node which involves determining and sending first data about a broadcast channel repetition pattern being, or about to broadcast, by a first base station. In some embodiments this information may be sent periodically from a network node to at least a second network node which may be a second base station of a neighbor cell to the first base station or a node for controlling the second base station. In some embodiment the first data may optionally be sent in response to receiving 601 a request from the second network node (or indeed some other network node). For instance the second network node may be about to initiate transmission of a broadcast channel repetition pattern by the second base station and wants to co-ordinate the broadcast channel repetition patterns. Additionally or alternatively in some embodiments the first data may be sent by the first network node following a decision to initiate 602 transmission of a broadcast channel repetition pattern by the first base station, for example as described above in relation to FIG. 6a. Before initiating transmission of a broadcast channel repetition pattern the first network node may determine 603 the status of at least one neighbouring cell to the first base station. The first network node may, for example, determine the status as described above in relation to steps 102, 103a and 103b of FIG. 6a.

At step 604 the first network node may determine first data regarding the broadcast channel repetition pattern to be or being transmitted by the first base station to the second base station. The first data first data comprises at least timing information about the timing of said time windows of the first mode of operation, for example the start time of a period of the operation in the first mode, the duration of a period of operation in the first mode and/or the period or interval between successive periods of operation in the first mode. The first data is then sent 605 to a second network node.

The broadcast channel repetition pattern information which is sent, i.e. the first data, may comprise at least some of the following parameters:
Pattern repetition periodicity or frequency; and/or
Pattern starting reference time, e.g. SFN of neighbor cell. starting time of a period of operation in the first mode For example referring back to FIG. 5c the pattern repetition periodicity or frequency corresponds to the identified period P between successive periods 501 of operation in the first mode of operation. The staring time of a period of operation in the first cell, e.g. time t1 from FIG. 5b or 5c may correspond to the start of the first period 501 of operation in the first mode. In some instances the timing information may additionally or alternatively comprise the duration d of periods of operation in the first mode The pattern information which is sent, i.e. the first data, may further comprise one or more of the following parameters:
Pattern density i.e. number of repetitions over certain duration. For example 20 repetitions within 40 ms or 40 repetitions within 40 ms period, i.e. the number of broadcast repetitions within a given period during operation in the first mode;
Subframes in which broadcast channel is repeated e.g. bit map with 1 representing broadcast channel is transmitted and 0 means it is not transmitted, i.e. an indication of one or more radio sub-frames in which a broadcast channel is repeated;
Power level of broadcast channel;
Indication whether power boosting is applied or not for transmitting broadcast channel;
Duration over which the pattern applies e.g. over 5 seconds, unlimited time etc, e.g. referring to FIG. 5c the duration between t1 and t6;
Ending time of the pattern, e.g. time t6 from FIG. 5c; and/or
Type of broadcast channel e.g. PBCH.

The first data may be sent from the first network node to the second network node for the purposes of co-coordinating operation of the first and second base station with regard to the transmission of a broadcast channel repetition pattern by the first and second base stations. As described previously with respect to FIG. 6a the network nodes may co-ordinate 606a such that any periods of operation of the first base station in the first mode are substantial simultaneous with periods of operation of the second base station in the first mode. Alternatively the network nodes may co-ordinate 606b such that any periods of operation of the first base station in the first mode do not substantial overlap with periods of operation of the second base station in the first mode. Following the co-ordination the first network node may transmit first data about the final broadcast channel repetition pattern to be used to the second node and may the initiate 607 transmission of broadcast channel repetition pattern by the first base station.

Transmitting the first data thus allows the network nodes to co-ordinate operation of the first and/or second base stations as described previously.

A number of the above mentioned pattern parameters, i.e. parameters of the broadcast channel repetition pattern, can be pre-defined or signaled to another network node. This may be achieved in various ways in different embodiments. For example:

In one exemplary embodiment only the pattern periodicity is signaled by the first network node to another network node and the remaining parameters are pre-defined. For example the pattern starting time may be pre-defined as SFN=0. The pattern density may also be pre-defined e.g. broadcast channel repetition in every $2^{nd}$ subframe over 40 ms duration.

In another exemplary embodiment the pattern periodicity as well as some of the other patterns (e.g. pattern starting time such as SFN=64) can also be signaled by the network node to another network node.

As mentioned the first network node may send the pattern proactively or in response to a request received from the target network node. The first network node may send the pattern to another node periodically or on event triggered basis e.g. whenever pattern is changed, when new network node is detected etc.

Figure 8:
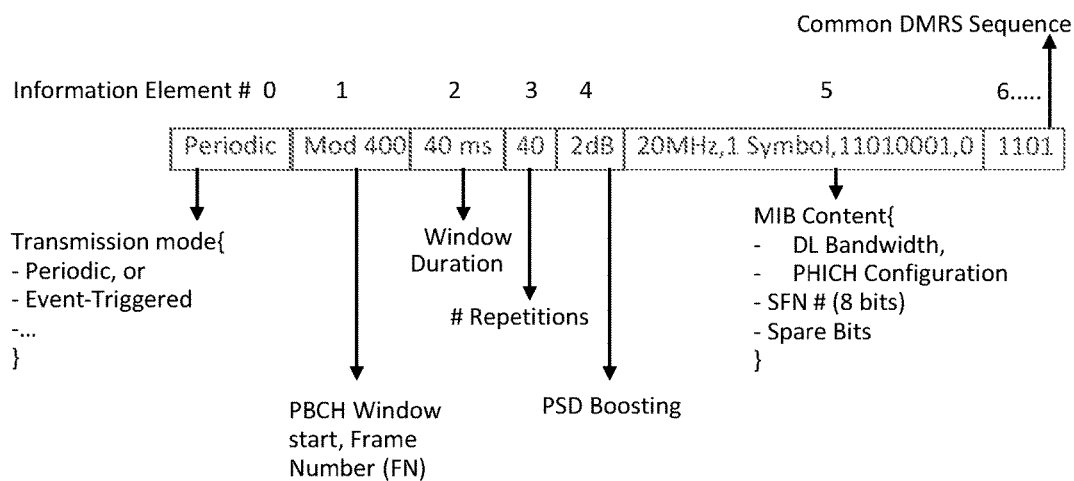
FIG. 8 illustrates a non-limiting example of data that may be transmitted to co-ordinate broadcast channel repetitions.

The first data may be sent from the first node to the second node using any suitable communication between network nodes. In other words the notification of the PBCH pattern information may be transmitted by using messages exchanged via X2 or S1 or any other suitable communication interface between neighbor base stations. One example of a message format for exchange is illustrated in FIG. 8. In this example, it can be that this message contains a number of information elements (IEs). In this example there is one IE defining how the frequent PBCH transmissions (repetitions) are going to be performed, e.g. periodically or event triggered etc., one IE defining the period with which this time window occurs, another IE defining the time duration of this window, e.g. 40 ms and another IE specifying the number of PBCH repetitions within the specified time window.

In some embodiments the message format may contain the PSD boosting to be applied during PBCH transmission. Additionally or alternatively the message can contain the content of MIB.

If the PBCH is repeated more than once per subframe, e.g. 8 or 12 OFDM symbols per subframe are used, then the number of OFDM symbols per subframe used for PBCH transmission can also included in the message to be exchanged within the communication interface between base stations such as X2 or S1 in 3GPP LTE, or any other suitable interface.

Additionally, this message may include the DM RS to be used jointly by the neighbor cells when both repeat intensively PBCH.

It will be understood from the above that this message can be used by the neighbor station so as to define when and how to schedule its broadcast channel repetition pattern, i.e. the periods of frequent PBCH transmissions, i.e. periods of operation in the first mode.

Regarding the allocation of the PBCH repetitions window per cell, i.e. the time window of operation in the first mode of the base station of a particular cell, in one embodiment this can be done by considering the number of N strongest interfering cells (in DL) and by setting appropriately the repetition period. E.g. In a group of 7 neighbor cells, the repetition period could, for example, be 280 ms or 560 ms and each cell among these 7 neighbors gets its 40 ms repetition period.

The example shown in FIG. 7 indicate that each of cells 1, 2 and 3 are all using a period of PBCH repetitions, i.e. a period of operation in the first mode, and that the number of time repetitions is similar for each of these cells. This may be the case where each cell is seeking to achieve a similar level of coverage enhancement, for example of the order of 15 dB or so. In some instance though in some cells the required level of coverage enhancement may be different, for instance less than 15 dB. In this case such other cell may operate with a fewer PBCH time repetitions, i.e. a lower number of repetitions. This may be achieved by having a shorter period of operation in the first mode of operation and/or by operating with a lower pattern density, i.e. number of repetition in a given period. This would then be reflected in the repetition scheme to be applied within that cell. Thus is the example of FIG. 7 cell 4 for example could be operating with fewer PBCH repetitions. It is of course also possible that a cell is not applying any PBCH repetition, i.e. is operating in the second mode of operation, e.g. with conventional broadcast channel repetition.

It will be appreciated that the periodicity of the time window containing intense PBCH repetitions can be defined taking into account the number the number of UEs, e.g. MTC UEs, being active in the cell and in need of listening PBCH. In some embodiments it may be desirable to have a relatively stationary pattern, i.e. not fluctuating in time based on the different numbers of users being active at different time instants. The number of UEs, e.g. MTC UEs, can be based upon counting the number of stationary UEs in the cell and upon selecting the ones being active at least once during a given time window which is defined in the order of the time window that these PBCH repetitions occur, e.g. within the next 1200 msec. In some embodiments some extra margin may be taken into account so as to consider UEs entering the cell.

A second network node, which receives the information related to the broadcast channel repetition pattern used in the first network node, may also adapt its own pattern for use in the second network node. For example the second network may change its pattern periodicity if it is very different compared to the pattern periodicity used in neighbor network nodes.

In one aspect a second network node may receive first data regarding a broadcast channel repetition pattern to be or being transmitted by a first base station from a first network node. As mentioned above the first data may comprise at least timing information about the timing of said time windows of the first mode of operation. The second network mode may then generate at least one control signal based on said control data for controlling broadcast transmissions of a second base station.

Figure 9:
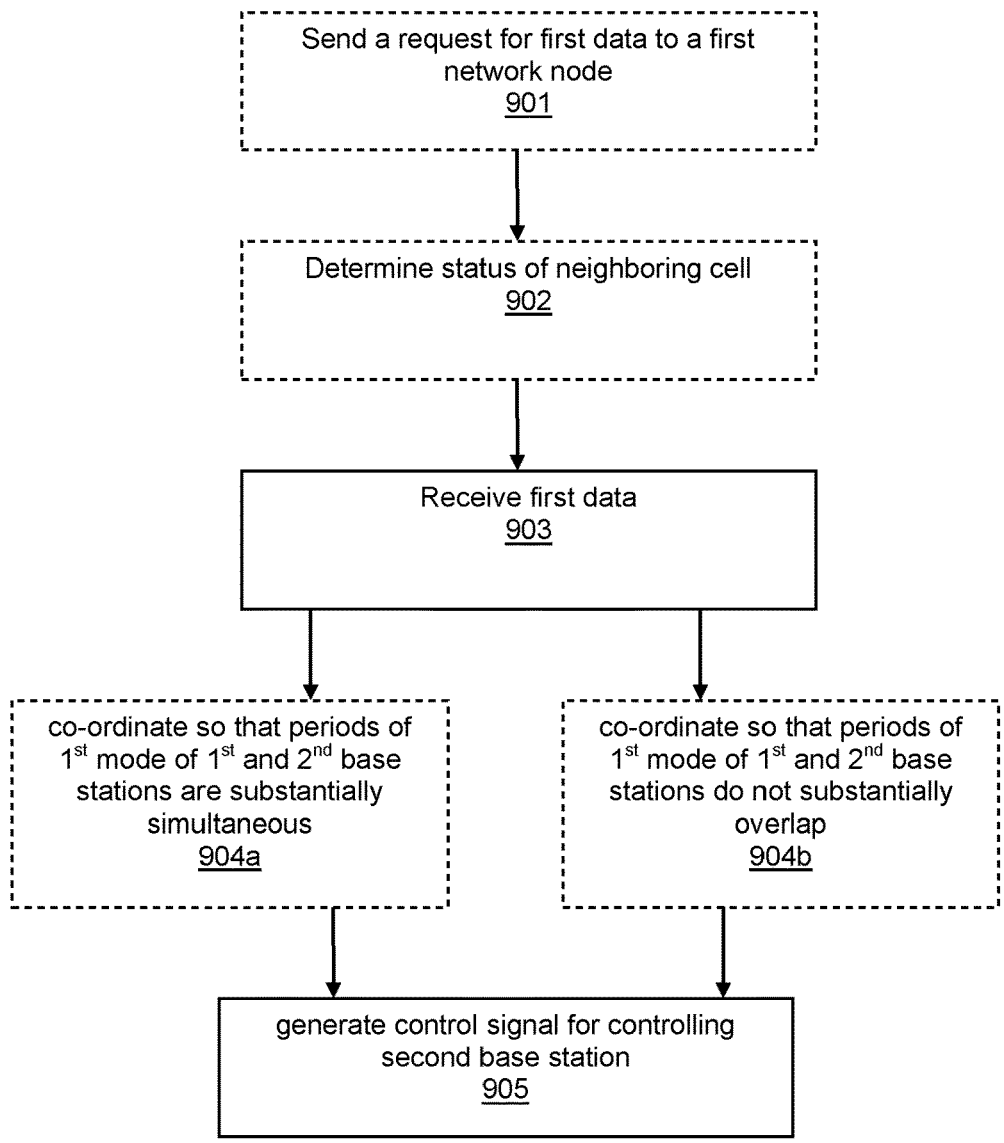
FIG. 9 is a flow chart illustrating a method of operating a second network node according to an embodiment.

FIG. 9 illustrates a method according to one embodiment. FIG. 9 illustrates one method in a second network node which involves receiving first data about a broadcast channel repetition pattern being, or about to broadcast, by a first base station. In some embodiments this information may be sent periodically from a first network node to the second network node which may be a second base station of a neighbor cell to the first base station or a node for controlling the second base station. In some embodiment the first data may optionally be received in response to sending 901 a request from the second network node to the first network node. For instance the second network node may be about to initiate transmission of a broadcast channel repetition pattern by the second base station and wants to co-ordinate the broadcast channel repetition patterns. Additionally or alternatively in some embodiments the first data may be sent by the first network node following a decision to initiate transmission of a broadcast channel repetition pattern by the first base station, for example as described above in relation to FIG. 6a.

In some embodiments the method may comprise the second network determining 902 the status of at least one neighbouring cell to the second base station, e.g. the first base station. The second network node may, for example, determine the status as described above in relation to steps 102, 103a and 103b of FIG. 6a.

At step 603 the second network node receives the first data regarding the broadcast channel repetition pattern to be or being transmitted by the first base. The first data first data comprises at least timing information about the timing of said time windows of the first mode of operation and may take any of the forms discussed above.

The first data may be sent from the first network node to the second network node for the purposes of co-coordinating operation of the first and second base station with regard to the transmission of a broadcast channel repetition pattern by the first and second base stations. As described previously with respect to FIG. 6a the network nodes may optionally co-ordinate 904a such that any periods of operation of the first base station in the first mode are substantial simultaneous with periods of operation of the second base station in the first mode. Alternatively the network nodes may optionally co-ordinate 904b such that any periods of operation of the first base station in the first mode do not substantial overlap with periods of operation of the second base station in the first mode.

The second network node may then generate 905 a control signal for controlling the broadcast transmission of the second base station. In some embodiments this may comprise controlling the second base station to initiate a broadcast channel repetition pattern or to alter or adapt a broadcast channel repetition pattern currently being transmitted.

In addition a network node (e.g. base stations) can transmit the information regarding the broadcast channel repetition pattern to its users, i.e. UEs. Thus the network node may also signal at least information related to its own broadcast channel repetition pattern to its own UEs i.e. UEs served by the network node.

Embodiments also relate to a method in the network node comprising signaling to the UE the information related to the broadcast channel repetition pattern used in one or more other network nodes e.g. cells served by neighbor network nodes of the UE.

Thus in one aspect a network node may transmit to one or more user equipments served by a serving cell, information regarding a broadcast channel repetition pattern to be or being transmitted in a neighbouring cell to the serving cell.

Figure 10:
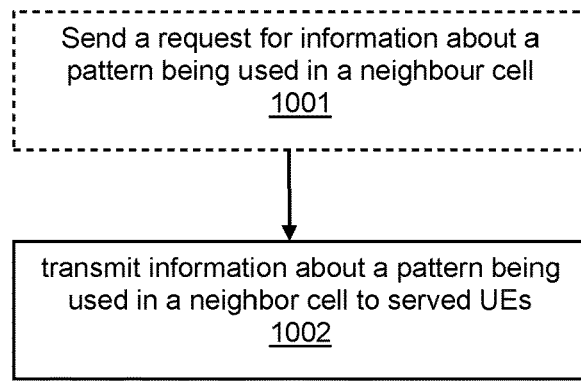
FIG. 10 is a flow chart illustrating another method of operating a network node according to an embodiment.

FIG. 10 illustrates an example of a method according to one embodiment. FIG. 10 illustrates one method in a network node which involves transmitting, to at least one UE served by a serving cell, information about a broadcast channel repetition pattern being or to be transmitted by a neighbor cell. The method optionally may involve the network node sending 1001 a request for information regarding the broadcast channel repetition pattern being or to be transmitted by a neighbor cell. In other embodiments however the network node may already be aware of the information. The network node then transmits 1002, to at least one UE being served by a serving cell, information about a broadcast channel repetition pattern being or to be transmitted by a neighbor.

The network node may signal the information for one or more cells included in the neighbor cell list information sent to the UE for assisting radio measurements e.g. SNR, SINR, RSRP, RSRQ, path loss, cell identification etc.

The information may be signaled to the UEs in any of the RRC states e.g. RRC idle state, RRC connected state etc.

The information may be signaled to the UEs at specific times or events e.g. when UE does cell change such as handover. Other examples of cell change are cell reselection, RRC connection re-establishment, RRC connection release with redirection, PCell or PCC change in carrier aggregation (CA) etc.

The network node may signal the information about the pattern in different manner. For example it may signal in any of the following manner:
  Signaling complete information about the patterns used in the serving cell of the UE and in the neighbor cells
  Signaling information about the pattern used in the serving cell of the UE and only differential information of pattern used in neighbor cells with respect to the pattern used in the serving cell;
  Signaling information about the pattern used in the serving cell of the UE and an indicator indicating whether the neighbor cell has the same pattern as in serving cell or not.
  Any of the above signaling mechanism except that pattern of certain reference cell which may not be the serving cell is signaled to the UE.

It will be appreciated that the method illustrated in FIG. 10 may be implemented as a stand alone method or may be implemented following or as part of any of the methods described above, in particular the methods described with reference to FIGS. 6a, 6b and 9.

A UE, upon receiving broadcast channel pattern information as described above, can use the pattern data for one or more radio operations or tasks. Examples of such operations are:
  reading the broadcast channel of the target cell to acquire its SI (e.g. SFN) during the instances of the repetition of the pattern before doing cell change. This is because signal is likely to be weak in HO region.
  reading the broadcast channel of the target cell to acquire its SI during the instances of the repetition of the pattern if the received signal level from the target cell is below a threshold; otherwise reading the broadcast channel without pattern (i.e. existing broadcast channel or normal broadcast channel)
  using the received pattern information to cancel or mitigating or minimize or eliminate the interference generated from the broadcast channel (e.g. PBCH) transmissions in neighbor cells.

Figure 11:
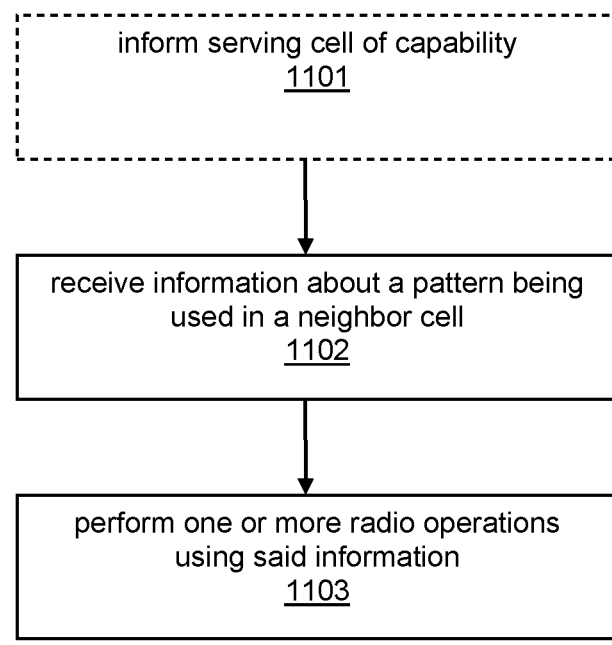
FIG. 11 is a flow chart illustrating another method of operating a user equipment according to an embodiment

In one aspect therefore a UE may receive information relating to a broadcast channel repetition pattern to be or being transmitted in a neighbouring cell to the cell serving the user equipment; and use such information relating to the broadcast channel repetition pattern of the neighbouring cell to perform one or more radio operations. FIG. 11 illustrates one example of an embodiment.

The UE may receive 1102 information relating to a broadcast channel repetition pattern to be or being transmitted in a neighbouring cell to the cell serving the user equipment and use 1103 such information to perform one or more radio operations. As described above the radio operations may comprise at least one of: interference mitigation;

reading of broadcast information transmitted in the neighbouring cell; acquisition of system information transmitted in the neighbouring cell; and acquisition of a system frame number for neighbouring cell.

In some embodiments a UE may optionally inform 1101 a suitable network node that it supports the capability of handling (e.g. receiving and using) broadcast channel repetition pattern information for one or more tasks, i.e. radio tasks.

The capability indication from the UEs is desirable since all UEs may not be capable of performing measurements on cells on carriers by receiving and using the broadcast channel repetition pattern information as disclosed in this disclosure. The UE may also signal additional information as part of the capability. The additional information may comprise of any one or more of the following:

That UE can receive and use the broadcast channel repetition pattern only for serving cell, for neighbor cells or for any cell;

That UE can receive and use the broadcast channel repetition pattern only for serving cell, for neighbor cells or for any cell for specific tasks e.g. for performing interference mitigation caused by broadcast channel;

That UE can receive and use the broadcast channel repetition pattern only for serving cell, for neighbor cells or for any cell for one or more tasks only for cells one or more of: serving carrier frequency, for inter-frequency carrier, for carriers on carrier aggregation.

The UE can receive and use the pattern information in RRC idle state, RRC connected state or in any RRC state.

The network node receiving such capability information may use such information for one or more tasks. For example the network node may signal the pattern to the UE only if it supports the capability. In another example the network node may signal the pattern to the UE only if it can use it for interference mitigation. In yet another example the network node may signal the pattern for the neighbor cell to the UE only if it can use it for the interference mitigation.

As described above in the situation where two neighboring cells are synchronized and transmitting the same MIB content then it can, in some situations, be beneficial to align the periods of broadcast channel repetition. In some situations however, for instance where a relatively large number of terminals in the relevant cells are not capable of interference cancellation then it may be decided not to apply coordinated transmission techniques so as not to create significant interference to normal terminals.

The various embodiments described above this allows the application of a method of repeating PBCH intermittently within given time windows. The methods describe enables a UE to receive and use a broadcast channel even in situations of large path loss. The UE may be able to use broadcast data from neighbor cells even if radio conditions are poor e.g. path loss between UE and neighboring base station is very large.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

Various exemplary embodiments of the invention are set out in the following statements:

1. A method, in a first network node of a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode, the method comprising:
   determining first data regarding a broadcast channel repetition pattern to be or being transmitted by a first base station, wherein said first data comprises at least timing information about the timing of said time windows of the first mode of operation; and
   sending said first data to a second network node that controls operation of a second base station neighbouring the first base station.

2. A method as described in statement 1 wherein said first network node sends said first data to said second network node in response to a request received from the second network node.

3. A method as described in any preceding statement further comprising the step of initiating transmission of the broadcast channel repetition pattern by said first base station.

4. A method as described in statement 3 wherein the first network node initiates said transmission of the broadcast channel repetition pattern in response to at least one of:
   a detection of a threshold number of user equipments served by the first base station would benefit from coverage enhancement;
   to a request from at least one user equipment served by the first base station; and
   a request received from another network node.

5. A method as described in any of statements 3 to 4 further comprising, before initiating transmission of the broadcast channel repetition pattern, determining a status of at least one neighbouring cell to the first base station.

6. A method as described in statement 5 wherein determining the status of at least one neighbouring cell comprises determining whether or not the neighbouring cell is at least one of:
   synchronised with a cell of the first base station; or
   time aligned with a cell of the first base station.

7. A method as described in statement 5 or statement 6 wherein determining the status of at least one neighbouring cell comprises determining whether or not the neighbouring cell is broadcasting the same master information block content as the first base station.

8. A method as described in any of statements 5 to 7 wherein said at least one neighbouring cell comprises a cell of said second base station and wherein the first network node sends the first data to the second network node so as to co-ordinate the timing of the broadcast channel repetition pattern with any broadcast channel repetition pattern transmitted by the second base station.

9. A method as described in statement 8 wherein, in the event that the second base station is synchronised with the first base station and broadcasting the same master information block content, the first network node co-ordinates with the second network node such that the first and second base stations both transmit a broadcast channel repetition pattern and that periods of operation in the first mode of the first and second base stations are substantially simultaneous.

10. A method as described in any of statements 8 to 9 wherein, in the event that the second base station is not synchronised with and/or not broadcasting the same master information block content as the first base station, the first network node co-ordinates with the second network node such that a period of operation in the first mode of the first base station does not substantially overlap with a period of operation in the first mode of the second base station.

11. A method as described in any of statements 8 to 9 wherein, in the event that the second base station is not synchronised with and/or not broadcasting the same master information block content as the first base station, the first network node determines whether a number of user equipments served by the first base station and/or the second base station that support interference cancellation is above a threshold amount and,
in the event that said number is not above the threshold the first network node co-ordinates with the second network node such that a period of operation in the first mode of the first base station is substantially simultaneous with a period of operation in the first mode of the second base station; and
in the event that said number is above the threshold the first network node co-ordinates with the second network node such that a period of operation in the first mode of the first base station does not substantially overlap with a period of operation in the first mode of the second base station.

12. A method as described in any of statements 1 to 5 wherein the first network node sends the first data to the second network node so as to co-ordinate the timing of the broadcast channel repetition pattern with any broadcast channel repetition pattern transmitted by a second base station in a neighbouring cell to a cell of the first base station and wherein the first network node determines whether a number of user equipments served by at the first base station and/or the second base station that support interference cancellation is above a threshold amount and,
in the event that said number is not above the threshold the first network node co-ordinates with the second network node such that a period of operation in the first mode of the first base station is substantially simultaneous with a period of operation in the first mode of the second base station; and
in the event that said number is above the threshold the first network node co-ordinates with the second network node such that a period of operation in the first mode of the first base station does not substantially overlap with a period of operation in the first mode of the second base station.

13. A method as described in any of statements 1 to 5 wherein the first network node sends the first data to the second network node so as to co-ordinate the timing of the broadcast channel repetition pattern with any broadcast channel repetition pattern transmitted by a second base station in a neighbouring cell to a cell of the first base station and wherein the first network node co-ordinates with the second network node such that a period of operation in the first mode of the first base station does not substantially overlap with a period of operation in the first mode of the second base station.

14. A method, in a second network node of a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode, the method comprising:
receiving first data regarding a broadcast channel repetition pattern to be or being transmitted by a first base station from a first network node, wherein said first data comprises at least timing information about the timing of said time windows of the first mode of operation, and
generating at least one control signal based on said control data for controlling broadcast transmissions of a second base station.

15. A method as described in statement 14 comprising the step, prior to receiving the first data, of sending a request to the first network node for the first data.

16. A method as described in any of statements 14 or 15 further comprising, determining the status of the first base station.

17. A method as described in statement 16 wherein determining the status of the first base station comprises determining whether or not the first base station is at least one of:
synchronised with the second base station;
time aligned with the second base station; or
broadcasting the same master information block content as the second base station.

18. A method as described in statement 17 wherein, in the event that the second base station is synchronised with the first base station and broadcasting the same master information block content, the second network node co-ordinates with the first network node such that the first and second base stations both transmit a broadcast channel repetition pattern and that periods of operation in the first mode of the first and second base stations are substantially simultaneous.

19. A method as described in any of statements 17 or 18 wherein, in the event that the second base station is not synchronised with and/or not broadcasting the same master information block content as the first base station, the second network node co-ordinates with the first network node such that a period of operation in the first mode of the second base station does not substantially overlap with a period of operation in the first mode of the first base station.

20. A method as described in any of statements 17 to 18 wherein, in the event that the second base station is not synchronised with and/or not broadcasting the same master information block content as the first base station, the second network node determines whether a number of user equipments served by the first base station and/or the second base station that support interference cancellation is above a threshold amount and,
in the event that said number is not above the threshold the second network node co-ordinates with the first network node such that a period of operation in the first mode of the second base station is substantially simultaneous with a period of operation in the first mode of the first base station; and
in the event that said number is above the threshold the second network node co-ordinates with the first network node such that a period of operation in the first mode of the second base station does not substantially overlap with a period of operation in the first mode of the first base station.

21. A method as described in any of statements 14 to 20 comprising generating a control signal to control the second base station to transmit at least part of said first data to user equipments served by the second base station.

22 A method as described in any preceding statement wherein said timing information comprises a repetition frequency of periods of operation in said first mode and/or a starting time of a period of operation in the first mode.

23. A method as described in any preceding statement wherein said first data further comprises the content of a master information block.

24. A method as described in any preceding statement wherein said first data further comprises at least one of:
the number of broadcast repetitions within a given period during operation in the first mode;
an indication of one or more radio sub-frames in which a broadcast channel is repeated;
a power level for the broadcast channel;
an indication of whether or not power boosting is applied for transmitting the broadcast channel;
a duration for the broadcast channel repetition pattern;
ending time for the broadcast channel repetition pattern; or
the type of broadcast channel.

25. A method in a user equipment comprising:
receiving information relating to a broadcast channel repetition pattern to be or being transmitted in a neighbouring cell to the cell serving the user equipment; and
using said information relating to the broadcast channel repetition pattern of the neighbouring cell to perform one or more radio operations.

26. A method as described in statement 25, wherein said one or more radio operations comprises at least one of:
interference mitigation;
reading of broadcast information transmitted in the neighbouring cell;
acquisition of system information transmitted in the neighbouring cell; and
acquisition of a system frame number for neighbouring cell.

27 A method, in a network node of a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode, the method comprising:
transmitting to one or more user equipments served by a serving cell information regarding a broadcast channel repetition pattern to be or being transmitted in a neighbouring cell to the serving cell.

28 A method as described in statement 27 wherein said information regarding a broadcast channel repetition pattern comprises at least one of:
information about the broadcast channel repetition pattern being used in the neighbouring cell;
information about a broadcast channel repetition pattern being used in the serving cell and differential information about the broadcast channel repetition pattern being used in the neighbouring cell;
information about a broadcast channel repetition pattern being used in the serving cell and an indication whether or not the neighbouring cell has the same broadcast channel repetition pattern;
information about a broadcast channel repetition pattern of a reference cell and differential information about the broadcast channel repetition pattern being used in the neighbouring cell; and
information about a broadcast channel repetition pattern of a reference cell and an indication whether or not the neighbouring cell has the same broadcast channel repetition pattern.

29. A network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode, the network node being adapted to:
determine first data regarding a broadcast channel repetition pattern to be or being transmitted by a first base station, wherein said first data comprises at least timing information about the timing of said time windows of the first mode of operation; and
send said first data to a second network node that controls operation of a second base station neighbouring the first base station.

30. A network node as described in statement 29 wherein the network node is adapted to send said first data to said second network node in response to a request received from the second network node.

31. A network node as described in statement 29 or statement 30 wherein the network node is adapted to initiate transmission of the broadcast channel repetition pattern by said first base station.

32. A network node as described in statement 31 wherein the network node is adapted to initiate said transmission of the broadcast channel repetition pattern in response to at least one of:
a detection of a threshold number of user equipments served by the first base station would benefit from coverage enhancement;
to a request from at least one user equipment served by the first base station; and
a request received from another network node.

33. A network node as described in statement 31 or statement 32 wherein the network node is adapted to determine a status of at least one neighbouring cell to the first base station before initiating transmission of the broadcast channel repetition pattern.

34. A network node as described in statement 33 wherein determining the status of at least one neighbouring cell comprises determining whether or not the neighbouring cell is at least one of:
synchronised with a cell of the first base station; or
time aligned with a cell of the first base station.

35. A network node as described in statement 33 or statement 34 wherein determining the status of at least one neighbouring cell comprises determining whether or not the neighbouring cell is broadcasting the same master information block content as the first base station.

36. A network node as described in any of statements 33 to 35 wherein said at least one neighbouring cell comprises a cell of said second base station and wherein the network node is adapted to send the first data to the second network node so as to co-ordinate the timing of the broadcast channel repetition pattern transmitted by the first base station with any broadcast channel repetition pattern transmitted by the second base station.

37. A network node as described in statement 36 wherein the network node is adapted to, in the event that the second base station is synchronised with the first base station and broadcasting the same master information block content, co-ordinate with the second network node such that the first and second base stations both transmit a broadcast channel repetition pattern and that periods of operation in the first mode of the first and second base stations are substantially simultaneous.

38. A network node as described in any of statements 36 to 37 wherein the network node is adapted to, in the event that the second base station is not synchronised with and/or not broadcasting the same master information block content as the first base station, co-ordinate with the second network node such that a period of operation in the first mode of the first base station does not substantially overlap with a period of operation in the first mode of the second base station.

39. A network node as described in any of statements 36 to 37 wherein the network node is adapted to, in the event that the second base station is not synchronised with and/or not broadcasting the same master information block content as the first base station, determine whether a number of user equipments served by the first base station and/or the second base station that support interference cancellation is above a threshold amount and,
in the event that said number is not above the threshold the network node is adapted to co-ordinate with the second network node such that a period of operation in the first mode of the first base station is substantially simultaneous with a period of operation in the first mode of the second base station; and
in the event that said number is above the threshold the network node is adapted to co-ordinate with the second network node such that a period of operation in the first mode of the first base station does not substantially overlap with a period of operation in the first mode of the second base station.

40. A network node as described in any of statements 29 to 33 wherein the network node is adapted to send the first data to the second network node so as to co-ordinate the timing of the broadcast channel repetition pattern transmitted by the first base station with any broadcast channel repetition pattern transmitted by a second base station in a neighbouring cell to a cell of the first base station and wherein the network node is adapted to determine whether a number of user equipments served by at the first base station and/or the second base station that support interference cancellation is above a threshold amount and,
in the event that said number is not above the threshold the network node is adapted to co-ordinate with the second network node such that a period of operation in the first mode of the first base station is substantially simultaneous with a period of operation in the first mode of the second base station; and
in the event that said number is above the threshold the network node is adapted to co-ordinate with the second network node such that a period of operation in the first mode of the first base station does not substantially overlap with a period of operation in the first mode of the second base station.

41. A network node as described in any of statements 29 to 33 wherein the network node is adapted to send the first data to the second network node so as to co-ordinate the timing of the broadcast channel repetition pattern transmitted by the first base station with any broadcast channel repetition pattern transmitted by a second base station in a neighbouring cell to a cell of the first base station and wherein the network node is adapted to co-ordinate with the second network node such that a period of operation in the first mode of the first base station does not substantially overlap with a period of operation in the first mode of the second base station.

42 A network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode, the network node being adapted to:
receive, from a first network node, first data regarding a broadcast channel repetition pattern to be or being transmitted by a first base station, wherein said first data comprises at least timing information about the timing of said time windows of the first mode of operation, and
generate at least one control signal based on said control data for controlling broadcast transmissions of a second base station.

43. A network node as described in statement 42, wherein the network node is adapted to send a request to the first network node for the first data.

44. A network node as described in any of statements 42 or 43, wherein the network node is adapted determine the status of the first base station.

45. A network node as described in statement 44 wherein determining the status of the first base station comprises determining whether or not the first base station is at least one of:
synchronised with the second base station;
time aligned with the second base station; or
broadcasting the same master information block content as the second base station.

46. A network node as described in statement 45 wherein the network node is adapted to, in the event that the second base station is synchronised with the first base station and broadcasting the same master information block content, co-ordinate with the first network node such that the first and second base stations both transmit a broadcast channel repetition pattern and that periods of operation in the first mode of the first and second base stations are substantially simultaneous.

47. A network node as described in any of statements 45 or 46 wherein the network node is adapted to, in the event that the second base station is not synchronised with and/or not broadcasting the same master information block content as the first base station, co-ordinate with the first network node such that a period of operation in the first mode of the second base station does not substantially overlap with a period of operation in the first mode of the first base station.

48. A network node as described in any of statements 45 to 46 wherein the network node is adapted to, in the event that the second base station is not synchronised with and/or not broadcasting the same master information block content as the first base station, determine whether a number of user equipments served by the first base station and/or the second base station that support interference cancellation is above a threshold amount and,
in the event that said number is not above the threshold the network node is adapted to co-ordinate with the first network node such that a period of operation in the first mode of the second base station is substantially simultaneous with a period of operation in the first mode of the first base station; and
in the event that said number is above the threshold the network node is adapted to co-ordinate with the first network node such that a period of operation in the first mode of the second base station does not substantially overlap with a period of operation in the first mode of the first base station.

49. A network node as described in any of statements 42 to 48 wherein the network node is adapted generate a control signal to control the second base station to transmit at least part of said first data to user equipments served by the second base station.

50. A network node as described in any of statements 29 to 49 wherein said timing information comprises a repetition frequency of periods of operation in said first mode and/or a starting time of a period of operation in the first mode.

51. A network node as described in any of statements 29 to 50 wherein said first data further comprises the content of a master information block.

52. A network node as described in any of statements 29 to 51 wherein said first data further comprises at least one of:
the number of broadcast repetitions within a given period during operation in the first mode;
an indication of one or more radio sub-frames in which a broadcast channel is repeated;
a power level for the broadcast channel;
an indication of whether or not power boosting is applied for transmitting the broadcast channel;
a duration for the broadcast channel repetition pattern;
ending time for the broadcast channel repetition pattern; or
the type of broadcast channel.

53. A user equipment for use in a telecommunication network, wherein the user equipment is adapted to:
receive information relating to a broadcast channel repetition pattern to be or being transmitted in a neighbouring cell to the cell serving the user equipment; and
perform one or more radio operations using said information relating to the broadcast channel repetition pattern of the neighbouring cell.

54. A user equipment as described in statement 53, wherein said one or more radio operations comprises at least one of:
interference mitigation;
reading of broadcast information transmitted in the neighbouring cell;
acquisition of system information transmitted in the neighbouring cell; and
acquisition of a system frame number for neighbouring cell.

55. A network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode, the network node being adapted to:
transmit to one or more user equipments served by a serving cell information regarding a broadcast channel repetition pattern to be or being transmitted in a neighbouring cell.

56. A network node as described in statement 55 wherein said information regarding a broadcast channel repetition pattern comprises at least one of:
information about the broadcast channel repetition pattern being used in the neighbouring cell;
information about a broadcast channel repetition pattern being used in the serving cell and differential information about the broadcast channel repetition pattern being used in the neighbouring cell;
information about a broadcast channel repetition pattern being used in the serving cell and an indication whether or not the neighbouring cell has the same broadcast channel repetition pattern;
information about a broadcast channel repetition pattern of a reference cell and differential information about the broadcast channel repetition pattern being used in the neighbouring cell; and
information about a broadcast channel repetition pattern of a reference cell and an indication whether or not the neighbouring cell has the same broadcast channel repetition pattern.

57. A network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode, the network node comprising a processor and a memory, said memory containing instructions executable by said processor whereby said network node is operative to:
determine first data regarding a broadcast channel repetition pattern to be or being transmitted by a first base station, wherein said first data comprises at least timing information about the timing of said time windows of the first mode of operation; and
send said first data to a second network node that controls operation of a second base station neighbouring the first base station.

58. A network node as described in statement 57 wherein the network node is further operative to send said first data to said second network node in response to a request received from the second network node.

59. A network node as described in statement 57 or statement 58 wherein the network node is further operative to initiate transmission of the broadcast channel repetition pattern by said first base station.

60. A network node as described in statement 59 wherein the network node is further operative to initiate said transmission of the broadcast channel repetition pattern in response to at least one of:
a detection of a threshold number of user equipments served by the first base station would benefit from coverage enhancement;
to a request from at least one user equipment served by the first base station; and
a request received from another network node.

61. A network node as described in statement 59 or statement 60 wherein the network node is further operative to determine a status of at least one neighbouring cell to the first base station before initiating transmission of the broadcast channel repetition pattern.

62. A network node as described in statement 61 wherein determining the status of at least one neighbouring cell comprises determining whether or not the neighbouring cell is at least one of:
    synchronised with a cell of the first base station; or
    time aligned with a cell of the first base station.
63. A network node as described in statement 61 or statement 62 wherein determining the status of at least one neighbouring cell comprises determining whether or not the neighbouring cell is broadcasting the same master information block content as the first base station.
64. A network node as described in any of statements 61 to 63 wherein said at least one neighbouring cell comprises a cell of said second base station and wherein the network node is further operative to send the first data to the second network node so as to co-ordinate the timing of the broadcast channel repetition pattern transmitted by the first base station with any broadcast channel repetition pattern transmitted by the second base station.
65. A network node as described in statement 64 wherein the network node is further operative to, in the event that the second base station is synchronised with the first base station and broadcasting the same master information block content, co-ordinate with the second network node such that the first and second base stations both transmit a broadcast channel repetition pattern and that periods of operation in the first mode of the first and second base stations are substantially simultaneous.
66. A network node as described in any of statements 64 to 65 wherein the network node is further operative to, in the event that the second base station is not synchronised with and/or not broadcasting the same master information block content as the first base station, co-ordinate with the second network node such that a period of operation in the first mode of the first base station does not substantially overlap with a period of operation in the first mode of the second base station.
67. A network node as described in any of statements 64 to 65 wherein the network node is further operative to, in the event that the second base station is not synchronised with and/or not broadcasting the same master information block content as the first base station, determine whether a number of user equipments served by the first base station and/or the second base station that support interference cancellation is above a threshold amount and,
    in the event that said number is not above the threshold the network node is further operative to co-ordinate with the second network node such that a period of operation in the first mode of the first base station is substantially simultaneous with a period of operation in the first mode of the second base station; and
    in the event that said number is above the threshold the network node is further operative to co-ordinate with the second network node such that a period of operation in the first mode of the first base station does not substantially overlap with a period of operation in the first mode of the second base station.
68. A network node as described in any of statements 57 to 61 wherein the network node is further operative to send the first data to the second network node so as to co-ordinate the timing of the broadcast channel repetition pattern transmitted by the first base station with any broadcast channel repetition pattern transmitted by a second base station in a neighbouring cell to a cell of the first base station and wherein the network node is further operative to determine whether a number of user equipments served by at the first base station and/or the second base station that support interference cancellation is above a threshold amount and,
    in the event that said number is not above the threshold the network node is further operative to co-ordinate with the second network node such that a period of operation in the first mode of the first base station is substantially simultaneous with a period of operation in the first mode of the second base station; and
    in the event that said number is above the threshold the network node is further operative to co-ordinate with the second network node such that a period of operation in the first mode of the first base station does not substantially overlap with a period of operation in the first mode of the second base station.
69. A network node as described in any of statements 57 to 61 wherein the network node is further operative to send the first data to the second network node so as to co-ordinate the timing of the broadcast channel repetition pattern transmitted by the first base station with any broadcast channel repetition pattern transmitted by a second base station in a neighbouring cell to a cell of the first base station and wherein the network node is further operative to co-ordinate with the second network node such that a period of operation in the first mode of the first base station does not substantially overlap with a period of operation in the first mode of the second base station.
70. A network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode, the network node comprising a processor and a memory, said memory containing instructions executable by said processor whereby said network node is operative to:
    receive, from a first network node, first data regarding a broadcast channel repetition pattern to be or being transmitted by a first base station, wherein said first data comprises at least timing information about the timing of said time windows of the first mode of operation, and
    generate at least one control signal based on said control data for controlling broadcast transmissions of a second base station.
71. A network node as described in statement 70, wherein the network node is further operative to send a request to the first network node for the first data.
72. A network node as described in any of statements 70 or 71, wherein the network node is further operative determine the status of the first base station.
73. A network node as described in statement 72 wherein determining the status of the first base station comprises determining whether or not the first base station is at least one of:
    synchronised with the second base station;
    time aligned with the second base station; or
    broadcasting the same master information block content as the second base station.
74. A network node as described in statement 73 wherein the network node is further operative to, in the event that the second base station is synchronised with the first base station and broadcasting the same master information block content, co-ordinate with the first network node such that the first and second base stations both transmit a broadcast channel repetition pattern and that periods of operation in the first mode of the first and second base stations are substantially simultaneous.

75. A network node as described in any of statements 73 or 74 wherein the network node is further operative to, in the event that the second base station is not synchronised with and/or not broadcasting the same master information block content as the first base station, co-ordinate with the first network node such that a period of operation in the first mode of the second base station does not substantially overlap with a period of operation in the first mode of the first base station.

76. A network node as described in any of statements 73 to 74 wherein the network node is further operative to, in the event that the second base station is not synchronised with and/or not broadcasting the same master information block content as the first base station, determine whether a number of user equipments served by the first base station and/or the second base station that support interference cancellation is above a threshold amount and,
in the event that said number is not above the threshold the network node is further operative to co-ordinate with the first network node such that a period of operation in the first mode of the second base station is substantially simultaneous with a period of operation in the first mode of the first base station; and
in the event that said number is above the threshold the network node is further operative to co-ordinate with the first network node such that a period of operation in the first mode of the second base station does not substantially overlap with a period of operation in the first mode of the first base station.

77. A network node as described in any of statements 70 to 75 wherein the network node is further operative to generate a control signal to control the second base station to transmit at least part of said first data to user equipments served by the second base station.

78 A network node as described in any of statements 57 to 77 wherein said timing information comprises a repetition frequency of periods of operation in said first mode and/or a starting time of a period of operation in the first mode.

79. A network node as described in any of statements 57 to 78 wherein said first data further comprises the content of a master information block.

80. A network node as described in any of statements 57 to 79 wherein said first data further comprises at least one of:
the number of broadcast repetitions within a given period during operation in the first mode;
an indication of one or more radio sub-frames in which a broadcast channel is repeated;
a power level for the broadcast channel;
an indication of whether or not power boosting is applied for transmitting the broadcast channel;
a duration for the broadcast channel repetition pattern;
ending time for the broadcast channel repetition pattern; or
the type of broadcast channel.

81. A user equipment for use in a telecommunication network, the user equipment comprising a processor and a memory, said memory containing instructions executable by said processor whereby said user equipment is operative to:
receive information relating to a broadcast channel repetition pattern to be or being transmitted in a neighbouring cell to the cell serving the user equipment; and
perform one or more radio operations using said information relating to the broadcast channel repetition pattern of the neighbouring cell.

82. A user equipment as described in statement 81, wherein said one or more radio operations comprises at least one of:
interference mitigation;
reading of broadcast information transmitted in the neighbouring cell;
acquisition of system information transmitted in the neighbouring cell; and
acquisition of a system frame number for neighbouring cell.

83. A network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode, the network node comprising a processor and a memory, said memory containing instructions executable by said processor whereby said network node is operative to:
transmit to one or more user equipments served by a serving cell information regarding a broadcast channel repetition pattern to be or being transmitted in a neighbouring cell.

84 A network node as described in statement 83 wherein said information regarding a broadcast channel repetition pattern comprises at least one of:
information about the broadcast channel repetition pattern being used in the neighbouring cell;
information about a broadcast channel repetition pattern being used in the serving cell and differential information about the broadcast channel repetition pattern being used in the neighbouring cell;
information about a broadcast channel repetition pattern being used in the serving cell and an indication whether or not the neighbouring cell has the same broadcast channel repetition pattern;
information about a broadcast channel repetition pattern of a reference cell and differential information about the broadcast channel repetition pattern being used in the neighbouring cell; and
information about a broadcast channel repetition pattern of a reference cell and an indication whether or not the neighbouring cell has the same broadcast channel repetition pattern.

85. A network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode, the network node comprising:
determining means for determining first data regarding a broadcast channel repetition pattern to be or being transmitted by a first base station, wherein said first data comprises at least timing information about the timing of said time windows of the first mode of operation; and sending means for sending said first data to a second network node that controls operation of a second base station neighbouring the first base station.

86. A network node as described in statement 85 wherein the sending means is for sending said first data to said second network node in response to a request received from the second network node.

87. A network node as described in statement 85 or statement 86 further comprising initiating means for initiating transmission of the broadcast channel repetition pattern by said first base station.

88. A network node as described in statement 87 wherein the initiating means is for initiating said transmission of the broadcast channel repetition pattern in response to at least one of:
a detection of a threshold number of user equipments served by the first base station would benefit from coverage enhancement;
to a request from at least one user equipment served by the first base station; and
a request received from another network node.

89. A network node as described in statement 87 or statement 88 further comprising status determining means for determining a status of at least one neighbouring cell to the first base station before initiating transmission of the broadcast channel repetition pattern.

90. A network node as described in statement 89 wherein determining the status of at least one neighbouring cell comprises determining whether or not the neighbouring cell is at least one of:
synchronised with a cell of the first base station; or
time aligned with a cell of the first base station.

91. A network node as described in statement 89 or statement 90 wherein determining the status of at least one neighbouring cell comprises determining whether or not the neighbouring cell is broadcasting the same master information block content as the first base station.

92. A network node as described in any of statements 89 to 91 further comprising co-ordinating means wherein said at least one neighbouring cell comprises a cell of said second base station, wherein the sending means is for sending the first data to the second network node and wherein the co-ordinating means is for co-ordinating the timing of the broadcast channel repetition pattern transmitted by the first base station with any broadcast channel repetition pattern transmitted by the second base station.

93. A network node as described in statement 92 wherein the co-ordinating means is for, in the event that the second base station is synchronised with the first base station and broadcasting the same master information block content, co-ordinating with the second network node such that the first and second base stations both transmit a broadcast channel repetition pattern and that periods of operation in the first mode of the first and second base stations are substantially simultaneous.

94. A network node as described in any of statements 92 to 93 wherein the co-ordinating means is for, in the event that the second base station is not synchronised with and/or not broadcasting the same master information block content as the first base station, co-ordinating with the second network node such that a period of operation in the first mode of the first base station does not substantially overlap with a period of operation in the first mode of the second base station.

95. A network node as described in any of statements 92 to 93 wherein the co-ordinating means is for, in the event that the second base station is not synchronised with and/or not broadcasting the same master information block content as the first base station, determining whether a number of user equipments served by the first base station and/or the second base station that support interference cancellation is above a threshold amount and,
in the event that said number is not above the threshold the co-ordinating means is for co-ordinating with the second network node such that a period of operation in the first mode of the first base station is substantially simultaneous with a period of operation in the first mode of the second base station; and
in the event that said number is above the threshold the co-ordinating means is for co-ordinating with the second network node such that a period of operation in the first mode of the first base station does not substantially overlap with a period of operation in the first mode of the second base station.

96. A network node as described in any of statements 85 to 89 further comprising a co-ordinating means and a status determining means, wherein the sending means is for sending the first data to the second network node and wherein the co-ordinating means is for co-ordinating the timing of the broadcast channel repetition pattern transmitted by the first base station with any broadcast channel repetition pattern transmitted by a second base station in a neighbouring cell to a cell of the first base station and wherein the status determining means is for determining whether a number of user equipments served by at the first base station and/or the second base station that support interference cancellation is above a threshold amount and,
in the event that said number is not above the threshold the co-ordinating means is for co-ordinating with the second network node such that a period of operation in the first mode of the first base station is substantially simultaneous with a period of operation in the first mode of the second base station; and
in the event that said number is above the threshold the co-ordinating means is for co-ordinating with the second network node such that a period of operation in the first mode of the first base station does not substantially overlap with a period of operation in the first mode of the second base station.

97. A network node as described in any of statements 85 to 89 further comprising a co-ordinating means, wherein the sending means is for sending the first data to the second network node and wherein the co-ordinating means is for co-ordinating the timing of the broadcast channel repetition pattern transmitted by the first base station with any broadcast channel repetition pattern transmitted by a second base station in a neighbouring cell to a cell of the first base station and wherein the co-ordinating means is for co-ordinating with the second network node such that a period of operation in the first mode of the first base station does not substantially overlap with a period of operation in the first mode of the second base station.

98 A network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode, the network node comprising:
a receiving means for receiving, from a first network node, first data regarding a broadcast channel repetition pattern to be or being transmitted by a first base station, wherein said first data comprises at least timing information about the timing of said time windows of the first mode of operation, and
control means for generating at least one control signal based on said control data for controlling broadcast transmissions of a second base station.
99. A network node as described in statement 98, further comprising sending means for sending a request to the first network node for the first data.
100. A network node as described in any of statements 98 or 99, further comprising status determining means for determining the status of the first base station.
101. A network node as described in statement 100 wherein determining the status of the first base station comprises determining whether or not the first base station is at least one of:
synchronised with the second base station;
time aligned with the second base station; or
broadcasting the same master information block content as the second base station.
102. A network node as described in statement 101 further comprising co-ordinating means for, in the event that the second base station is synchronised with the first base station and broadcasting the same master information block content, co-ordinating with the first network node such that the first and second base stations both transmit a broadcast channel repetition pattern and that periods of operation in the first mode of the first and second base stations are substantially simultaneous.
103. A network node as described in any of statements 101 or 102 comprising co-ordinating means for, in the event that the second base station is not synchronised with and/or not broadcasting the same master information block content as the first base station, co-ordinating with the first network node such that a period of operation in the first mode of the second base station does not substantially overlap with a period of operation in the first mode of the first base station.
104. A network node as described in any of statements 101 to 102 further comprising status determining means and co-ordinating means wherein, in the event that the second base station is not synchronised with and/or not broadcasting the same master information block content as the first base station, the status determining means is for determining whether a number of user equipments served by the first base station and/or the second base station that support interference cancellation is above a threshold amount and,
in the event that said number is not above the threshold the co-ordinating means is for co-ordinating with the first network node such that a period of operation in the first mode of the second base station is substantially simultaneous with a period of operation in the first mode of the first base station; and
in the event that said number is above the threshold the co-ordinating means is for co-ordinating with the first network node such that a period of operation in the first mode of the second base station does not substantially overlap with a period of operation in the first mode of the first base station.
105. A network node as described in any of statements 98 to 104 wherein control means is for generating a control signal to control the second base station to transmit at least part of said first data to user equipments served by the second base station.
106 A network node as described in any of statements 85 to 105 wherein said timing information comprises a repetition frequency of periods of operation in said first mode and/or a starting time of a period of operation in the first mode.
107. A network node as described in any of statements 85 to 106 wherein said first data further comprises the content of a master information block.
108. A network node as described in any of statements 85 to 107 wherein said first data further comprises at least one of:
the number of broadcast repetitions within a given period during operation in the first mode;
an indication of one or more radio sub-frames in which a broadcast channel is repeated;
a power level for the broadcast channel;
an indication of whether or not power boosting is applied for transmitting the broadcast channel;
a duration for the broadcast channel repetition pattern;
ending time for the broadcast channel repetition pattern; or
the type of broadcast channel.
109 A user equipment for use in a telecommunication network, wherein the user equipment comprises:
a receiving means receiving information relating to a broadcast channel repetition pattern to be or being transmitted in a neighbouring cell to the cell serving the user equipment; and
radio operation means for performing one or more radio operations using said information relating to the broadcast channel repetition pattern of the neighbouring cell.
110. A user equipment as described in statement 109, wherein said one or more radio operations comprises at least one of:
interference mitigation;
reading of broadcast information transmitted in the neighbouring cell;
acquisition of system information transmitted in the neighbouring cell; and
acquisition of a system frame number for neighbouring cell.
111. A network node for use in a telecommunication network having a plurality of base stations which are operable to transmit a broadcast channel repetition pattern comprising at least one time window of a first mode of operation, wherein the first mode of operation is interspersed between periods of a second mode of operation and wherein the number of repetitions of a broadcast channel in a given period is greater in the first mode than in the second mode, the network node comprising:
transmit means for transmitting to one or more user equipments served by a serving cell information regarding a broadcast channel repetition pattern to be or being transmitted in a neighbouring cell.
112 A network node as described in statement 111 wherein said information regarding a broadcast channel repetition pattern comprises at least one of:
information about the broadcast channel repetition pattern being used in the neighbouring cell;
information about a broadcast channel repetition pattern being used in the serving cell and differential information about the broadcast channel repetition pattern being used in the neighbouring cell;
information about a broadcast channel repetition pattern being used in the serving cell and an indication whether or not the neighbouring cell has the same broadcast channel repetition pattern;

information about a broadcast channel repetition pattern of a reference cell and differential information about the broadcast channel repetition pattern being used in the neighbouring cell; and information about a broadcast channel repetition pattern of a reference cell and an indication whether or not the neighbouring cell has the same broadcast channel repetition pattern.

The different means recited above in statements 85-112 may in some embodiments be implemented as computer programs stored in memory (e.g. in the memory modules in FIGS. 2 and 3 respectively) for execution by processors (e.g. the processing modules of FIGS. 2 and 3 respectively).

The invention claimed is:

1. A method in a user equipment comprising:

receiving information relating to a broadcast channel repetition pattern to be or being transmitted in a neighbouring cell to the cell serving the user equipment, the broadcast channel repetition pattern comprising at least one time window of a first mode of broadcast channel repetition, wherein the first mode of broadcast channel repetition is interspersed between periods of a second mode of broadcast channel repetition, and wherein the number of repetitions of a broadcast channel in a given period is greater in the first mode of broadcast channel repetition than in the second mode of broadcast channel repetition; and using said information relating to the broadcast channel repetition pattern of the neighbouring cell to perform one or more radio operations, wherein said information comprises (i) timing information about the timing of the at least one time window of the first mode of broadcast channel repetition in the neighbouring cell and (ii) information about a broadcast channel repetition pattern being used in the serving cell and an indication whether or not the neighbouring cell has the same broadcast channel repetition pattern, and wherein the one or more radio operations comprise mitigating interference generated by broadcast channel transmissions from the neighboring cell.

2. The method as claimed in claim 1, wherein said one or more radio operations further comprise at least one of:

reading of broadcast information transmitted in the neighbouring cell;

acquisition of system information transmitted in the neighbouring cell; and acquisition of a system frame number for the neighbouring cell.

3. A method, in a network node of a telecommunication network having a plurality of base stations which are operable to transmit a broadcast channel repetition pattern comprising at least one time window of a first mode of broadcast channel repetition, wherein the first mode of broadcast channel repetition is interspersed between periods of a second mode of broadcast channel repetition, and wherein the number of repetitions of a broadcast channel in a given period is greater in the first mode of broadcast channel repetition than in the second mode of broadcast channel repetition, the method comprising:

transmitting to one or more user equipments served by a serving cell information relating to a broadcast channel repetition pattern to be or being transmitted in a neighbouring cell, wherein the information comprises (i) timing information about the timing of the at least one time window of the first mode of broadcast channel repetition in the neighbouring cell and (ii) information about a broadcast channel repetition pattern being used in the serving cell and an indication whether or not the neighbouring cell has the same broadcast channel repetition pattern.

4. The method as claimed in claim 3, wherein said information relating to a broadcast channel repetition pattern further comprises at least one of:

information about the broadcast channel repetition pattern being used in the neighbouring cell;

information about a broadcast channel repetition pattern being used in the serving cell and differential information about the broadcast channel repetition pattern being used in the neighbouring cell;

information about a broadcast channel repetition pattern of a reference cell and differential information about the broadcast channel repetition pattern being used in the neighbouring cell; and information about a broadcast channel repetition pattern of a reference cell and an indication whether or not the neighbouring cell has the same broadcast channel repetition pattern.

5. A user equipment for use in a telecommunication network, the user equipment comprising a processor and a memory, said memory containing instructions executable by said processor whereby said user equipment is operative to:

receive information relating to a broadcast channel repetition pattern to be or being transmitted in a neighbouring cell to the cell serving the user equipment, the broadcast channel repetition pattern comprising at least one time window of a first mode of broadcast channel repetition, wherein the first mode of broadcast channel repetition is interspersed between periods of a second mode of broadcast channel repetition, and wherein the number of repetitions of a broadcast channel in a given period is greater in the first mode of broadcast channel repetition than in the second mode of broadcast channel repetition; and perform one or more radio operations using said information relating to the broadcast channel repetition pattern of the neighbouring cell, wherein said information comprises (i) timing information about the timing of the at least one time window of the first mode of broadcast channel repetition in the neighbouring cell and (ii) information about a broadcast channel repetition pattern being used in the serving cell and an indication whether or not the neighbouring cell has the same broadcast channel repetition pattern, and wherein the one or more radio operations comprise mitigating interference generated by broadcast channel transmissions from the neighboring cell.

6. The user equipment as claimed in claim 5, wherein said one or more radio operations further comprise at least one of:

reading of broadcast information transmitted in the neighbouring cell;

acquisition of system information transmitted in the neighbouring cell; and acquisition of a system frame number for the neighbouring cell.

7. A network node for use in a telecommunication network having a plurality of base stations which are operable to transmit a broadcast channel repetition pattern comprising at least one time window of a first mode of broadcast channel repetition, wherein the first mode of broadcast channel repetition is interspersed between periods of a second mode of broadcast channel repetition and wherein the number of repetitions of a broadcast channel in a given period is greater in the first mode of broadcast channel repetition than in the second mode of broadcast channel repetition, the network node comprising a processor and a memory, said memory containing instructions executable by said processor whereby said network node is operative to:

transmit to one or more user equipments served by a serving cell information relating to a broadcast channel repetition pattern to be or being transmitted in a neighbouring cell, wherein the information comprises (i) timing information about the timing of the at least one time window of the first mode of broadcast channel repetition in the neighbouring cell and (ii) information about a broadcast channel repetition pattern being used in the serving cell and an indication whether or not the neighbouring cell has the same channel repetition pattern.

8. The network node as claimed in claim 7, wherein said information relating to a broadcast channel repetition pattern further comprises at least one of:

information about the broadcast channel repetition pattern being used in the neighbouring cell;

information about a broadcast channel repetition pattern being used in the serving cell and differential information about the broadcast channel repetition pattern being used in the neighbouring cell;

information about a broadcast channel repetition pattern of a reference cell and differential information about the broadcast channel repetition pattern being used in the neighbouring cell; and information about a broadcast channel repetition pattern of a reference cell and an indication whether or not the neighbouring cell has the same broadcast channel repetition pattern.

9. A method, in a first network node of a telecommunication network having a plurality of base stations which are operable to transmit a broadcast channel repetition pattern comprising at least one time window of a first mode of broadcast channel repetition, wherein the first mode of broadcast channel repetition is interspersed between periods of a second mode of broadcast channel repetition, and wherein the number of repetitions of a broadcast channel in a given period is greater in the first mode of broadcast channel repetition than in the second mode of broadcast channel repetition, the method comprising:

determining first data regarding a broadcast channel repetition pattern to be or being transmitted by a first base station, wherein said first data comprises at least timing information about the timing of the at least one time window of the first mode of broadcast channel repetition; and sending said first data to a second network node that controls operation of a second base station neighbouring the first base station.

10. The method as claimed in claim 9, wherein the first network node sends the first data to the second network node so as to co-ordinate the timing of the broadcast channel repetition pattern with any broadcast channel repetition pattern transmitted by a second base station in a neighbouring cell to a cell of the first base station and wherein the first network node determines whether a number of user equipments served by the first base station and/or the second base station that support interference cancellation is above a threshold amount and, in the event that said number is not above the threshold amount, the first network node co-ordinates with the second network node such that a period of operation in the first mode of broadcast channel repetition of the first base station is substantially simultaneous with a period of operation in the first mode of broadcast channel repetition of the second base station; and in the event that said number is above the threshold amount, the first network node co-ordinates with the second network node such that a period of operation in the first mode of broadcast channel repetition of the first base station does not substantially overlap with a period of operation in the first mode of broadcast channel repetition of the second base station.

11. The method as claimed in claim 9, wherein the first network node sends the first data to the second network node so as to co-ordinate the timing of the broadcast channel repetition pattern with a broadcast channel repetition pattern transmitted by a second base station in a neighbouring cell to a cell of the first base station and wherein the first network node co-ordinates with the second network node such that a period of operation in the first mode of broadcast channel repetition of the first base station does not substantially overlap with a period of operation in the first mode of broadcast channel repetition of the second base station.

12. A method, in a second network node of a telecommunication network having a plurality of base stations which are operable to transmit a broadcast channel repetition pattern comprising at least one time window of a first mode of broadcast channel repetition, wherein the first mode of broadcast channel repetition is interspersed between periods of a second mode of broadcast channel repetition, and wherein the number of repetitions of a broadcast channel in a given period is greater in the first mode of broadcast channel repetition than in the second mode of broadcast channel repetition, the method comprising:

the second network node receiving, from a first network node, first data regarding a broadcast channel repetition pattern to be or being transmitted by a first base station from a first network node, wherein said first data comprises at least timing information about the timing of the at least one time window of the first mode of broadcast channel repetition; and the second network node generating at least one control signal based on said control data for controlling broadcast transmissions of a second base station.

13. A network node for use in a telecommunication network having a plurality of base stations which are operable to transmit a broadcast channel repetition pattern comprising at least one time window of a first mode of broadcast channel repetition, wherein the first mode of broadcast channel repetition is interspersed between periods of a second mode of broadcast channel repetition and wherein the number of repetitions of a broadcast channel in a given period is greater in the first mode of broadcast channel repetition than in the second mode of broadcast channel repetition, the network node comprising a processor and a memory, said memory containing instructions executable by said processor whereby said network node is operative to:

determine first data regarding a broadcast channel repetition pattern to be or being transmitted by a first base station, wherein said first data comprises at least timing information about the timing of the at least one time window of the first mode of broadcast channel repetition; and send said first data to a second network node that controls operation of a second base station neighbouring the first base station.

14. The network node as claimed in claim 13, wherein the network node is further operative to send the first data to the second network node so as to co-ordinate the timing of the broadcast channel repetition pattern transmitted by the first base station with any broadcast channel repetition pattern transmitted by a second base station in a neighbouring cell to a cell of the first base station and wherein the network node is further operative to determine whether a number of user equipments served by the first base station and/or the second base station that support interference cancellation is above a threshold amount and, in the event that said number is not above the threshold amount, the network node is further operative to co-ordinate with the second network node such that a period of operation in the first mode of broadcast channel repetition of the first base station is substantially simultaneous with a period of operation in the first mode of broadcast channel repetition of the second base station; and in the event that said number is above the threshold amount, the network node is further operative to co-ordinate with the second network node such that a period of operation in the first mode of broadcast channel repetition of the first base station does not substantially overlap with a period of operation in the first mode of broadcast channel repetition of the second base station.

15. The network node as claimed in claim 13, wherein the network node is further operative to send the first data to the second network node so as to co-ordinate the timing of the broadcast channel repetition pattern transmitted by the first base station with a broadcast channel repetition pattern transmitted by a second base station in a neighbouring cell to a cell of the first base station and wherein the network node is further operative to co-ordinate with the second network node such that a period of operation in the first mode of broadcast channel repetition of the first base station does not substantially overlap with a period of operation in the first mode of broadcast channel repetition of the second base station.

16. A network node for use in a telecommunication network having a plurality of base stations which are operable to transmit a broadcast channel repetition pattern comprising at least one time window of a first mode of broadcast channel repetition, wherein the first mode of broadcast channel repetition is interspersed between periods of a second mode of broadcast channel repetition and wherein the number of repetitions of a broadcast channel in a given period is greater in the first mode of broadcast channel repetition than in the second mode of broadcast channel repetition, the network node comprising a processor and a memory, said memory containing instructions executable by said processor whereby said network node is operative to:

receive, from a first network node, first data regarding a broadcast channel repetition pattern to be or being transmitted by a first base station, wherein said first data comprises at least timing information about the timing of the at least one time window of the first mode of broadcast channel repetition; and generate at least one control signal based on said control data for controlling broadcast transmissions of a second base station.

17. The network node as claimed in claim 16, wherein the network node is further operative to determine the status of the first base station.

18. The network node as claimed in claim 17, wherein determining the status of the first base station comprises determining whether or not the first base station is at least one of:

synchronised with the second base station;

time aligned with the second base station; and broadcasting the same master information block content as the second base station.

19. The network node as claimed in claim 18, wherein the network node is further operative to, in the event that the second base station is synchronised with the first base station and broadcasting the same master information block content, co-ordinate with the first network node such that the first and second base stations both transmit a broadcast channel repetition pattern and that periods of operation in the first mode of broadcast channel repetition of the first and second base stations are substantially simultaneous.

20. The network node as claimed in claim 18, wherein the network node is further operative to, in the event that the second base station is not synchronised with and/or not broadcasting the same master information block content as the first base station, co-ordinate with the first network node such that a period of operation in the first mode of broadcast channel repetition of the second base station does not substantially overlap with a period of operation in the first mode of broadcast channel repetition of the first base station.

\* \* \* \* \*